US006985256B2

(12) United States Patent
Cheng et al.

(10) Patent No.: US 6,985,256 B2
(45) Date of Patent: Jan. 10, 2006

(54) HALFTONING USING DOT AND LINE SCREENS TO AVOID TWO AND THREE COLOR MOIRÉ

(75) Inventors: Xiaoxue Cheng, Webster, NY (US); Robert P. Loce, Webster, NY (US); Shen-Ge Wang, Fairport, NY (US); Beilei Xu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1065 days.

(21) Appl. No.: 09/909,319

(22) Filed: Jul. 19, 2001

(65) Prior Publication Data

US 2002/0089708 A1  Jul. 11, 2002

Related U.S. Application Data

(63) Continuation-in-part of application No. 09/698,104, filed on Oct. 30, 2000, now Pat. No. 6,798,539.

(51) Int. Cl.
  H04N 1/52  (2006.01)
  H04N 1/58  (2006.01)
(52) U.S. Cl. .................... 358/1.9; 358/3.26; 358/533; 358/536
(58) Field of Classification Search ............... 358/1.9, 358/3.2, 3.26, 533–536
  See application file for complete search history.

(56) References Cited

U.S. PATENT DOCUMENTS 5,155,599 A * 10/1992 Delabastita ................ 358/3.26
6,641,241 B2 * 11/2003 Inoue ........................ 358/533

OTHER PUBLICATIONS

Thomas M. Holladay, "An Optimum Algorithm For Halftone Generation For Displays and Hard Copies", *Proceedings of the SID*, vol. 21/2, 1980.

* cited by examiner

*Primary Examiner*—Scott A. Rogers
(74) *Attorney, Agent, or Firm*—Jeannette Walder

(57) ABSTRACT

Moiré free color halftoning is achieved through the use of two dot screens and one or two line screens. The line screens may be, for example hybrid line screens. Frequency vectors associated with the screens combine to produce moiré frequency vectors representing moiré frequencies above or below the visual range. In one embodiment lines screens are used to halftone yellow and black separations and dot screens are used to halftone cyan and magenta separations. The dot screens are oriented at 15 and 75 degrees. The line screens are oriented at 45 and 135 degrees. Selected screens and screen orientations minimize screen interaction with mechanical or optical artifacts of a rendering device, thereby minimizing mechanical and optical moiré.

26 Claims, 16 Drawing Sheets

FIG. 16
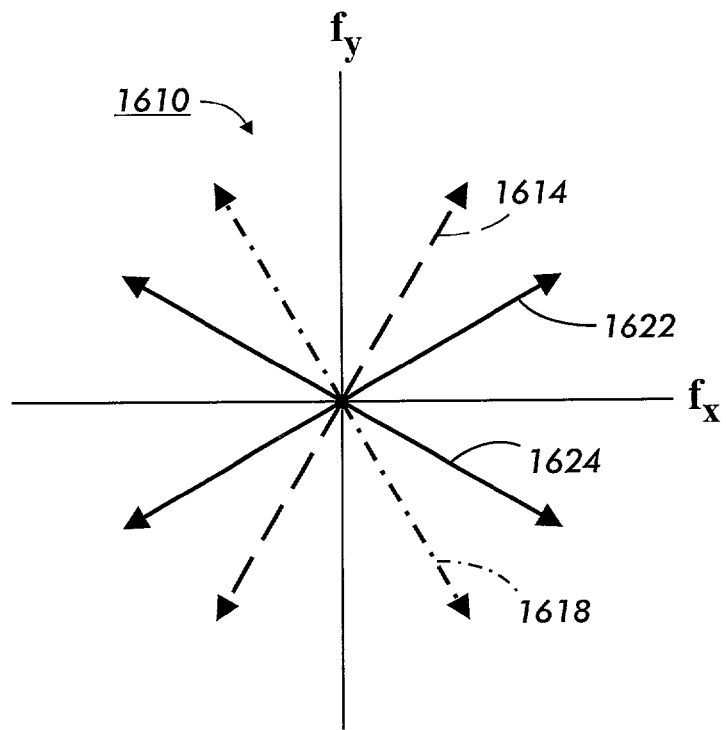
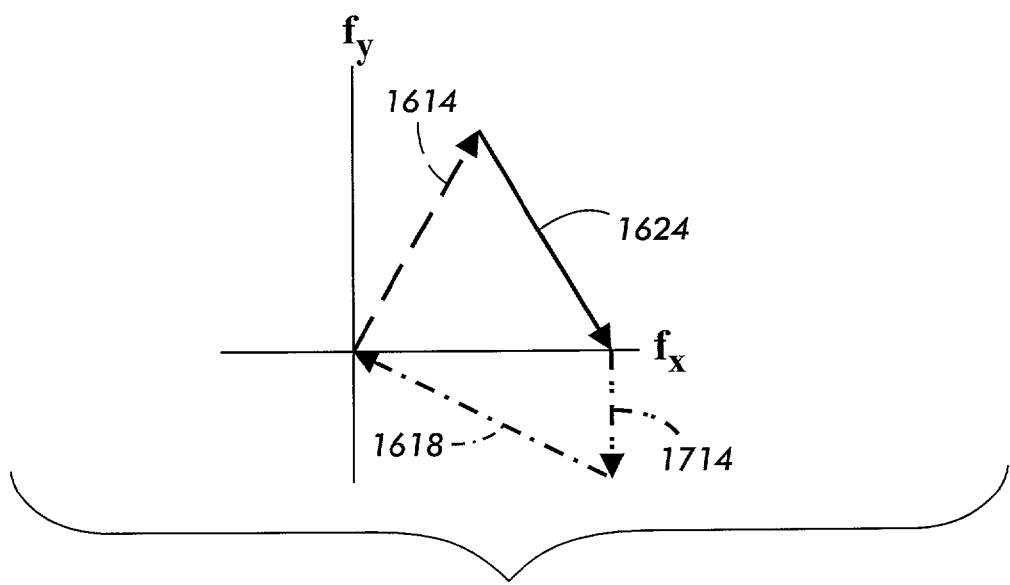
FIG. 17

HALFTONING USING DOT AND LINE SCREENS TO AVOID TWO AND THREE COLOR MOIRÉ

CROSS REFERENCE TO RELATED APPLICATIONS

This application is a continuation-in-part of U.S. patent application Ser. No. 09/698,104 filed Oct. 30, 2000 now U.S. Pat. No. 6,798,539 B1.

BACKGROUND OF THE INVENTION

1. Field of the Invention

This invention is directed to a process for substantially moiré-free halftoning color documents using combinations of cluster screens and line screens.

2. Description of Related Art

With the advent of inexpensive digital color printers, methods and systems of color digital halftoning have become increasingly important. It is well understood that most digital color printers operate in a binary mode, i.e., for each color separation, a corresponding color spot is either printed or not printed at a specified location or pixel. Digital halftoning controls the printing of color spots, where spatially averaging the printed color spots of all the color separations provides the illusion of the required continuous color tones.

The most common halftone technique is screening, which compares the required continuous color tone level of each pixel for each color separation with one of several predetermined threshold levels. The predetermined threshold levels are stored in a halftone cell, which is spatially replicated and tiled to form a halftone screen that is the size of a given image. If the required color tone level is darker than the threshold halftone level, a color spot is printed at the specified pixel. Otherwise the color spot is not printed. It is understood in the art that the distribution of printed pixels depends on the design of the halftone cell. For cluster halftone cells, all printed pixels are grouped into one or more clusters. If a cluster-halftone cell only generates a single cluster, it is referred to as a single-center halftone screen, a single-dot halftone cell, a single-cell halftone dot, or some similar terminology. Alternatively, halftone cells maybe dual-dot, tri-dot, quad-dot, supercells or the like, where supercells are halftone cells with multiple dot centers used to increase the angular accuracy of the screen or the number of gray levels that the screen can produce. As is the practice in the art, the terms "cells" and "screens" are used here somewhat interchangeably.

Halftone cells are typically two-dimensional threshold arrays and are relatively small in comparison to the overall image or document to be printed. Therefore, for a given color separation, the screening process uses an identical halftone cell to tile the complete image plane. The output of the screening process, using a single cell halftone dot, includes a pattern of multiple small "dots", which are regularly spaced and is determined by the size and the shape of the halftone cell. Typically, the shape and tiling geometry of the halftone cell is a square, rectangle, parallelogram, line, or the like. Various digital halftone screens having different shapes and angles are described in An Optimum Algorithm for Halftone Generation for Displays and Hard Copies, by T. M. Holladay, Proc. Soc. for Information Display, 21, p. 185 (1980). Hexagonal tiling has also been in employed in the halftoning art. The screening output, for square, rectangular or parallelogram tiling as a two-dimensionally repeated pattern, possesses two fundamental spatial frequency vectors, which are completely defined by the geometry of the halftone cell.

A common problem that arises in digital color halftoning is the occurrence of moiré patterns. Moiré patterns are undesirable interference patterns that occur when two or more color halftone separations are printed over each other. Since color mixing during the printing process is a non-linear process, frequency components other than the fundamental frequencies of the two or more color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequencies, which will be visibly evident as a very pronounced moiré interference pattern in the output. To avoid, for example, two-color moiré patterns due to misalignment, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly noticeable moiré patterns are produced.

In selecting different halftone screens, for example, for three color separations, it is desirable to avoid any two-color moiré as well as any three-color moiré. It is well known that in the traditional printing industry that three halftone screens, constructed of cells which are square in shape and identical, can be placed at 15°, 45° and 75°, respectively, from a point of origin, to provide the classical three-color moiré-free solution. This is described in Principles of Color Reproduction, by J. A. G. Yule, John Wiley & Sons. N.Y. 1967.

However, for digital halftoning, the freedom to rotate a halftone screen is limited by the raster structure, which defines the position of each pixel. Since $\tan(15°)$ and $\tan(75°)$ are irrational numbers, rotating a halftone screen to 15° or 75° cannot be exactly implemented in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

Other factors that limit the usefulness of the traditional 15, 45, 75-degree screen angle alignments in, for example, a xerographic environment, are process effects, such as, for example, the effects of development order and the so-called dual beam effect. Development order effects moiré when a first colorant interacts with the deposition of a second colorant. The interaction can contribute to an increased perceptibility of moiré. The dual beam effect can add frequency components to an image that beat with halftone screens and lead to moiré. The dual beam effect can occur where two or more beams are used to paint an image. For example, a slight spacing error or misalignment between two laser beams can create a periodic pattern such as a set of two lines that are close together and separated by a gap from a next set of close lines. This pattern possesses frequency components that can beat with the halftone screens to generate moiré. Other sources of error within printing devices that generate additional frequency components include photoreceptor velocity nonuniformity, mirror wobble, and raster start position jitter. In order to address these problems and others, screening techniques are desired that are robust and tolerant of the use of multiple beams, additional frequency components from other sources in the image writing and marking process, and colorant development order effects.

SUMMARY OF THE INVENTION

In order to address the above stated problems and provide the desired screening techniques, a method of halftoning a color image that avoids two and three color moiré patterning has been developed. The method includes the step of: selecting a set of screens that have fundamental frequency vectors that combine to yield only moiré frequency vectors of types selected from the group consisting of zero frequency moiré frequency vectors, near zero frequency moiré frequency vectors and high frequency moiré frequency vectors. Zero, near zero and high frequency moiré frequency vectors are associated with moiré patterns that are not objectionable. The method also includes the steps of associating a first dot screen from the selected set of screens with a first colorant, associating a second dot screen from the selected set of screens with a second colorant, and, associating a first line screen from the selected set of screens with a third colorant. Once the colorants are associated with appropriate screens a color image is received for halftoning, and the screens are used to halftone the image.

Some embodiments further include the step of associating a second line screen from the selected set of screens with a fourth colorant.

The line screens can be hybrid line screens. Hybrid line screens refer to those halftones that are lines for a portion of their gray-scale range and dots for another portion of the range.

In another embodiment the invention comprises a method of halftoning a color image that avoids two and three color moiré patterning including the step of selecting a set of screens that have fundamental frequency vectors that combine to yield only high frequency moiré frequency vectors. The method further includes the steps of associating a first dot screen from the selected set of screens with a first colorant, associating a first line screen from the selected set of screens with a second colorant, associating a second line screen from the selected set of screens with a third colorant, receiving the color image to be halftoned and, halftoning the color image with the associated screens.

An image processor operative to halftone an image so that the image can be rendered without displeasing moiré patterns includes a selected set of halftone screens or cells and a halftoner functional block. The selected set of halftone screens includes a first dot screen, a first line screen, and a third screen. The screens are selected and oriented so that fundamental frequency vectors of the screens combine to yield only moiré frequency vectors of types selected from the group consisting of zero frequency moiré frequency vectors, near zero frequency moiré frequency vectors, and high frequency moiré frequency vectors. The halftoner is operative to associate the first and second dot screens and the third screen with first, second and third color separations respectively, and to use the associated screens to halftone the image by halftoning the respective separations.

In some embodiments of the image processor, the selected set of halftone screens further comprises a second line screen. In that case, the halftoner is further operative to associate the second line screen with a fourth respective color separation and to use the associated screens to halftone the image by halftoning the respective separations One advantage of the present invention resides in a reduction in or elimination of three-color moiré.

Another advantage of the present invention is found in a reduction in or elimination of two-color moiré.

Yet another advantage of the present invention is an improvement in image quality where rendering devices idiosyncrasies would otherwise contribute to moiré.

Still other advantages of the present invention will become apparent to those skilled in the art upon a reading and understanding of the detail description below.

BRIEF DESCRIPTION OF THE DRAWINGS

Various exemplary embodiments of this invention will be described in detail, with reference to the following figures, wherein:

FIG. 16 shows a set of frequency vectors associated with an exemplary third set of orthogonal screens;

FIG. 17 is a vector diagram showing exemplary vectors from the set of FIG. 16 combining to produce a high frequency moiré vector;

DETAILED DESCRIPTION OF EXEMPLARY EMBODIMENTS

It is well known that color halftone printers are susceptible to moiré patterns. Therefore, there has been a long-felt need for convenient systems and methods for determining the spatial and angular positioning of the halftone dots necessary to avoid moiré patterns.

It should be appreciated that, according to this invention, a single-cell halftone dot does not necessarily have to be square in shape. In fact, in some cases, it is beneficial to consider a more general single-cell halftone dot shape other than a square, such as, for example, a non-orthogonal parallelogram. It should be further appreciated, however, that a square can be considered to be a subset of the more general class of parallelograms. Therefore, the following discussion regarding exemplary non-orthogonal parallelograms can be equally applied to square halftone dots, as desired. It should be further appreciated that a halftone cell does not need to be limited to the single cell type halftones to employ the present invention. Dual dots, quad dots, supercells and multicentered dots in general may be employed. For ease of explanation the analysis and discussion is presented for single dot cells. Those skilled in the art will understand how to extend this explanation to the multicentered dot case.

Figure 1:
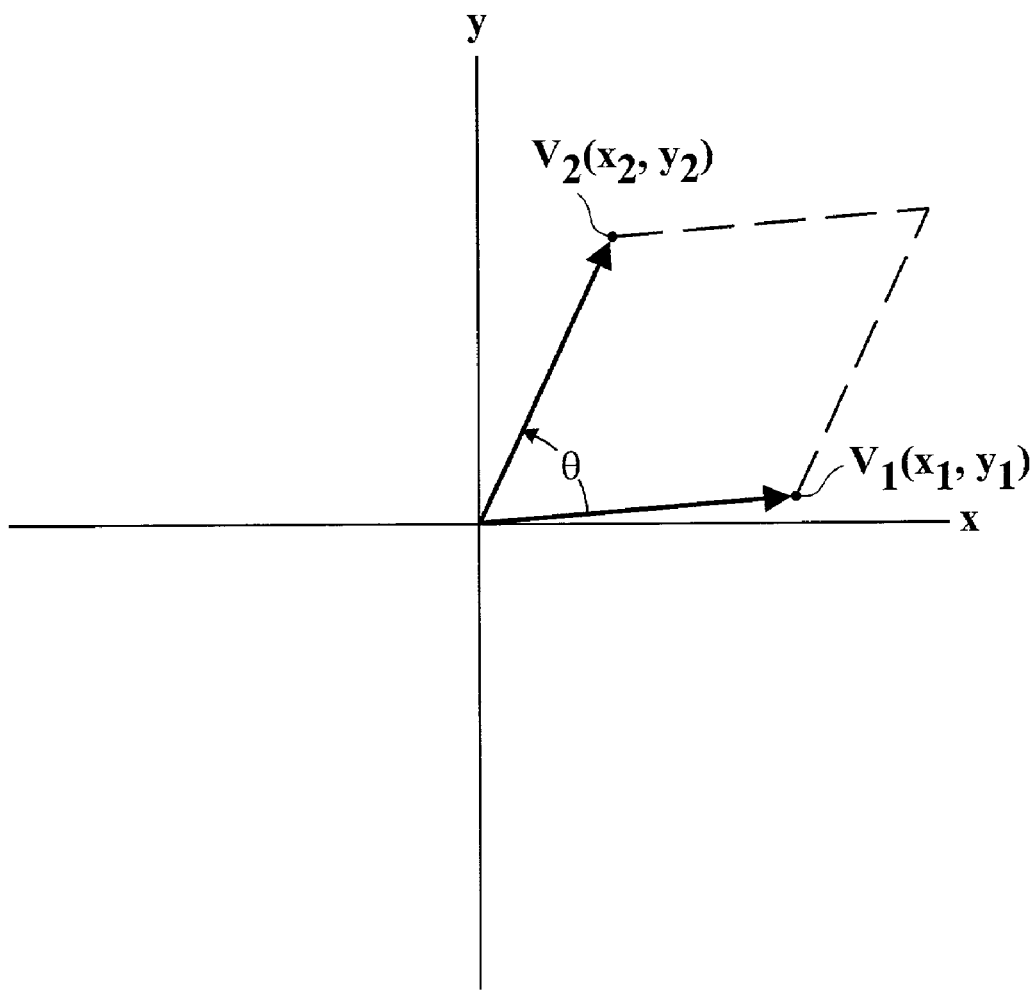
FIG. 1 is a two-dimensional spatial vector representation of a single-cell halftone screen.

To this end, as shown in FIG. 1, a single-cell halftone dot can be an arbitrarily shaped parallelogram and can be represented in the spatial domain by two vectors, $V_1 = (x_1, y_1)$ and $V_2 = (x_2, y_2)$. Since the specified halftone screen is a single-cell screen, the spatial domain representation is defined by the corresponding raster integer coordinates. In other words, the two spatial vectors $V_1$ and $V_2$ are specified by spatial coordinate values $x_1$, $y_1$, $x_2$ and $y_2$. If the given single-cell halftone dot represented by the graph shown in FIG. 1 is used by a halftone screening system.

Figure 2:
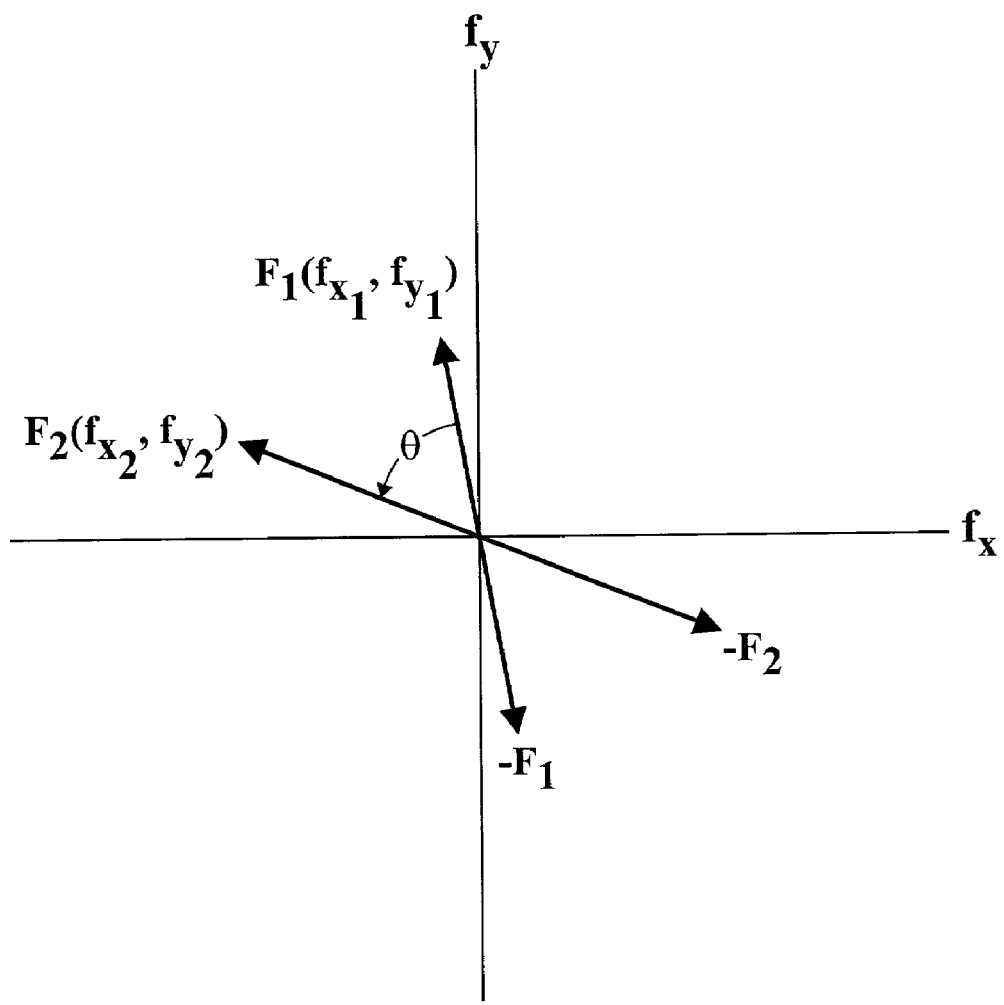
FIG. 2 is a frequency vector representation of the halftone screen of FIG. 1.

It should be appreciated that, by using frequency vector analysis, a two-dimensional repeated pattern can be represented in the frequency domain by two frequency vectors, $F_1=(f_{X1}, f_{Y1})$ and $F_2=(f_{X2}, f_{Y2})$. FIG. 2 illustrates, for example, the two frequency vectors, $F_1$ and $F_2$, corresponding to the two spatial vectors, $V_1$ and $V_2$, respectively. It should also be appreciated that the two frequency vectors $F_1$ and $F_2$ are perpendicular to the two spatial vectors $V_1$ and $V_2$, respectively, and that their vector lengths are given by:

$$|F_1| = \frac{1}{|V_2 \sin\theta|}, \text{ and} \qquad (1a)$$

$$|F_2| = \frac{1}{|V_1 \sin\theta|}; \qquad (1b)$$

where θ represents the angle between the vectors $V_1$ and $V_2$, which is also equal to the angle between the frequency vectors $F_1$ and $F_2$. Also, the area A of the parallelogram encompassed by $V_2$ and $V_1$ can be represented as:

$$A = |V_1 V_2 \sin\theta| \qquad (2a)$$

Alternately, the area A of the parallelogram can be written as a function of the spatial coordinates $x_1$, $y_1$, $x_2$ and $y_2$; i.e., as:

$$A = |x_1 y_2 - x_2 y_1| \qquad (2b)$$

Correspondingly, using Eqs. (2a) and (2b), Eqs. (1a) and (1b) can be recast as:

$$|F_1| = \frac{|V_1|}{A}, \text{ and} \qquad (3a)$$

$$|F_2| = \frac{|V_2|}{A}. \qquad (3b)$$

The vectors $F_1$ and $F_2$ can be decomposed into their scalar components as:

$$f_{x1} = \frac{-y_1}{A}, \qquad (4a)$$

$$f_{y1} = \frac{x_1}{A}, \qquad (4b)$$

$$f_{x2} = \frac{-y_2}{A}, \text{ and} \qquad (4c)$$

$$f_{y2} = \frac{x_2}{A}. \qquad (4d)$$

Therefore, Eqs. (4a)–(4d) express the frequency-to-spatial-component relationship for a cell defined by the spatial vectors $V_1$ and $V_2$. The frequency components, $f_{x1}$, $f_{y1}$, $f_{x2}$, and $f_{y2}$, are rational numbers completely defined by the four integer coordinate values, $x_1$, $y_1$, $x_2$ and $y_2$. Since Eqs. (4a)–(4d) describe a corresponding "mapping" of the frequency components to the spatial components, it should be appreciated that any analysis of the moiré-free conditions in the frequency domain can be easily translated into a spatial domain specification. It should be appreciated that, while the above equations are developed in relation to a non-orthogonal single-cell halftone dot having a parallelogram-like shape, it is apparent that the above equations may suitably describe other non-parallelogram shaped dots, for example, squares, rectangles, triangles, ellipses, hexagons, etc.

Figure 3:
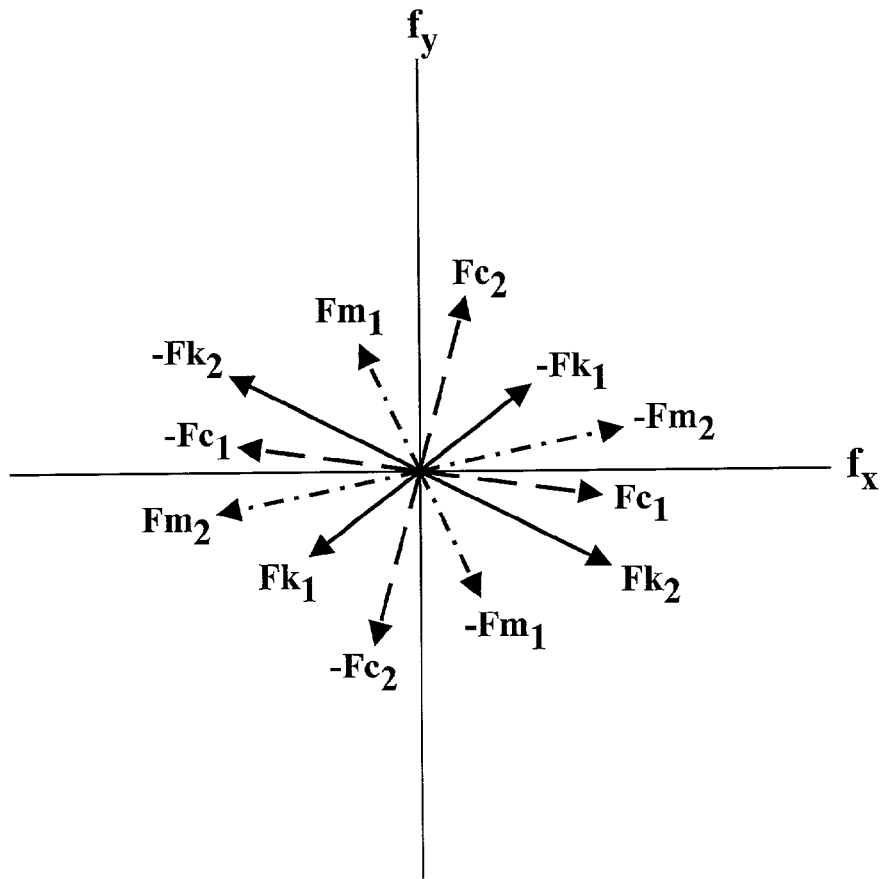
FIG. 3 illustrates a frequency domain representation of three single-cell halftone screens.

FIG. 3 is an exemplary vector representation in the frequency domain of three parallelogram halftone cells in the spatial domain used in the cyan (c), magenta (m), and black (k) color separations, respectively. As shown in FIGS. 1 and 2, the cyan, magenta, and black parallelogram single-cell halftone screens can be represented by pairs of spatial vectors $V_{1c}$ and $V_{2c}$, $V_{1m}$ and $V_{2m}$, and $V_{1k}$ and $V_{2k}$, respectively, corresponding to the frequency vector pairs $F_{1c}$ and $F_{2c}$, $F_{1m}$ and $F_{2m}$, and $F_{1k}$ and $F_{2k}$, respectively. The spatial vectors correspond to these frequency vectors and their negative counter parts, as shown in FIG. 3.

From FIG. 3, it is apparent that, to substantially reduce the likelihood of any three-color moiré occurring in any image printed using three single-cell halftone screens, the frequency vectors of the three color separations, for example, cyan, magenta and black, should satisfy the following vector equations:

$$F_{c_1}+F_{m_1}+F_{k_1}=0, \text{ and} \tag{5a}$$

$$F_{c_2}+F_{m_2}+F_{k_2}=0. \tag{5b}$$

Figure 4:
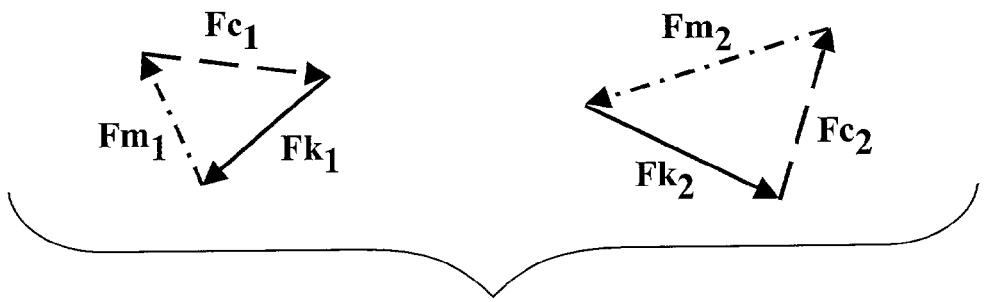
FIG. 4 illustrates an exemplary frequency domain representation of FIG. 3 constrained to satisfy moiré-free conditions.

FIG. 4 is a vector diagram illustrating the exemplary moiré-free vector relationships defined in Eqs. (5a) and (5b). It should be appreciated from frequency analysis that, for any frequency vector $F(f_x, f_y)$, there is always a conjugate frequency vector $F(-f_x, -f_y)$, hereafter denoted as $-F$. Therefore, it should also be appreciated that the two vectors F and $-F$ are exchangeable. Further, it should be appreciated that the arbitrary indices 1 and 2 may be exchanged between the two frequency vectors $F_1$ and $F_2$ in each color separation. Thus, Eqs. (5a) and (5b) can be considered as a general description for the three-color moiré-free condition, which can include all other possible combinations, such as, for example, the following Eqs. (5c) and (5d):

$$F_{c2}+F_{m_1}-F_{k_1}=0, \text{ and} \tag{5c}$$

$$F_{c_1}-F_{m_2}-F_{k_2}=0. \tag{5d}$$

Using the scalar components of the frequency representation and Eqs. (4a)–(4d) and the above moiré-free conditions, Eqs. (5a) and (5b) can be translated into the following spatial vector equations, Eqs. (6a) and (6b), or scalar equations, Eqs. (7a)–(7d):

$$\frac{V_{c_1}}{A_c}+\frac{V_{m_1}}{A_m}+\frac{V_{k_1}}{A_k}=0, \text{ and} \tag{6a}$$

$$\frac{V_{c_2}}{A_c}+\frac{V_{m_2}}{A_m}+\frac{V_{k_2}}{A_k}=0; \text{ or,} \tag{6b}$$

$$\frac{x_{c_1}}{A_c}+\frac{x_{m_1}}{A_m}+\frac{x_{k_1}}{A_k}=0, \tag{7a}$$

$$\frac{y_{c_1}}{A_c}+\frac{y_{m_1}}{A_m}+\frac{y_{k_1}}{A_k}=0 \tag{7b}$$

$$\frac{x_{c_2}}{A_c}+\frac{x_{m_2}}{A_m}+\frac{x_{k_2}}{A_k}=0, \text{ and} \tag{7c}$$

$$\frac{y_{c_2}}{A_c}+\frac{y_{m_2}}{A_m}+\frac{y_{k_2}}{A_k}=0. \tag{7d}$$

It should be appreciated that, if the respective spatial coordinate values $x_1$, $x_2$, and $y_1$, $y_2$ are integer values, the four equations, Eqs. (7a)–(7d), can be converted to:

$$A_mA_kx_{c_1}+A_cA_kx_{m_1}+A_cA_mx_{k_1}=0, \tag{8a}$$

$$A_mA_ky_{c_1}+A_cA_ky_{m_1}+A_cA_my_{k_1}=0, \tag{8b}$$

$$A_mA_kx_{c_2}+A_cA_kx_{m_2}+A_cA_mx_{k_2}=0, \text{ and} \tag{8c}$$

$$A_mA_ky_{c_2}+A_cA_ky_{m_2}+A_cA_my_{k_2}=0. \tag{8d}$$

Using Eq. (2b), the three areas, Ac, Am and Ak, in Eqs. (8a)–(8d) can be expressed as:

$$A_c=|x_{c1}y_{c2}-x_{c2}y_{c1}|, \tag{8e}$$

$$A_m=|x_{m1}y_{m2}-x_{m2}y_{m1}|, \text{ and} \tag{8f}$$

$$A_k=|x_{k1}y_{k2}-x_{k2}y_{k1}|. \tag{8g}$$

Eqs. (8a)–(8d) specify the spatial vector component relationships for a moiré-free condition and can be used, as described below, to determine the sizes and angles for corresponding halftone cells.

Although the analysis provided above assumes that the spatial coordinates x and y are integers, the moiré-free condition given by Eqs. (8a)–(8d) is true even if x and y are arbitrary real numbers. For example, a classical solution can be found if all single-cell halftone screens are square-shaped and the areas of these squares are the same, i.e., $A_c=A_m=A_k=a^2$, where a is the length of the side of the square. By setting a cyan halftone screen at 15°, a magenta halftone screen at 75° and a black halftone screen at 45°, the six spatial vectors, which satisfy the moiré-free condition specified by Eqs. (8a)–(8d), are:

$$V_{c_1}:(\alpha\cdot\cos 15°,-\alpha\cdot\sin 15°), V_{c_2}:(\alpha\cdot\sin 15°,\alpha\cdot\cos 15°), \tag{9a}$$

$$V_{m_1}:(-\alpha\cdot\cos 75°,\alpha\cdot\sin 75°), V_{m_2}:(-\alpha\cdot\sin 75°,-\alpha\cdot\cos 75°), \tag{9b}$$

$$V_{k_1}:(-\alpha\cdot\cos 45°,-\alpha\cdot\sin 45°), V_{k_2}:(\alpha\cdot\sin 45°,-\alpha\cdot\cos 45°), \tag{9c}$$

It is apparent from Eqs. (9a)–(9c) that the spatial vectors of the cyan ($V_{c1}$, $V_{c2}$) and magenta ($V_{m1}$, $V_{m2}$) halftone screens of this classical solution do not correspond to rational numbers and, therefore, the classical moiré-free solution cannot be accurately implemented in conventional digital halftoning. Although halftone screens with multiple clusters can use rational numbers for specifying spatial vectors, such as in supercell halftoning, this approach results in some clusters having centers that do not lie directly on addressable points, i.e., do not lie on the pixel positions defined by the raster structure. Thus, the shape and center location varies from one cluster to another. Therefore, additional interference or moiré between screen frequencies and the raster frequency may occur. Given that, for the moiré-free condition, there are only four equations, Eqs. (8a)–(8d), with twelve variables, according to the three color separations of cyan, magenta, and black, for example, and four spatial coordinates for each color of the color separations, the set of solutions become infinite if x and y are arbitrary real numbers.

However, if the spatial coordinates, x and y, are restricted to the set of integers, the set of solutions becomes finite and can be practically handled. In particular, for most digital halftoning applications, the number of possible sizes for each single-cell screen is generally less than a hundred or so. As a result, all possible solutions satisfying the moiré-free condition given by Eqs. (8a)–(8d) can be readily searched. Unfortunately, it is apparent that very few solutions can be found if all clusters are limited to solely square-shaped, integer-specified cells.

However, the range of possible solutions can be greatly increased by applying non-orthogonal or, such as, for example, parallelogram-shaped, single-cell halftone screens. For example, the following spatial vectors describe three parallelogram halftone cells in the cyan, magenta and black color separations:

$$V_{c_1}: (4, 2), \quad V_{c_2}: (1, 7), \tag{10a}$$

$$V_{m_1}: (-1, 7), \quad V_{m_2}: (-4, -2), \tag{10b}$$

$$V_{k_1}: (-3, -5), \quad V_{k_2}: (3, -5). \tag{10c}$$

It should be appreciated that the spatial domain representation of the above vectors of Eqs. (10a)–(10c) are very similar to the classical solution for a 600×1200 dpi printer:

$$\text{Cyan: } -75.96o, \; 164.91pi \text{ and } 15.95o, 145.61pi; \tag{11a}$$

$$\text{Magenta: } -15.95o, \; 145.61pi \text{ and } 75.96o, 164.91pi; \tag{11b}$$

$$\text{Black: } 50.2o, \; 156.21pi \text{ and } -50.2o, 156.21pi. \tag{11c}$$

Therefore, it should be appreciated that at least substantially moiré-free halftone screens can be formed from non-orthogonal cluster cells to provide near classical moiré-free solutions.

Figure 5:
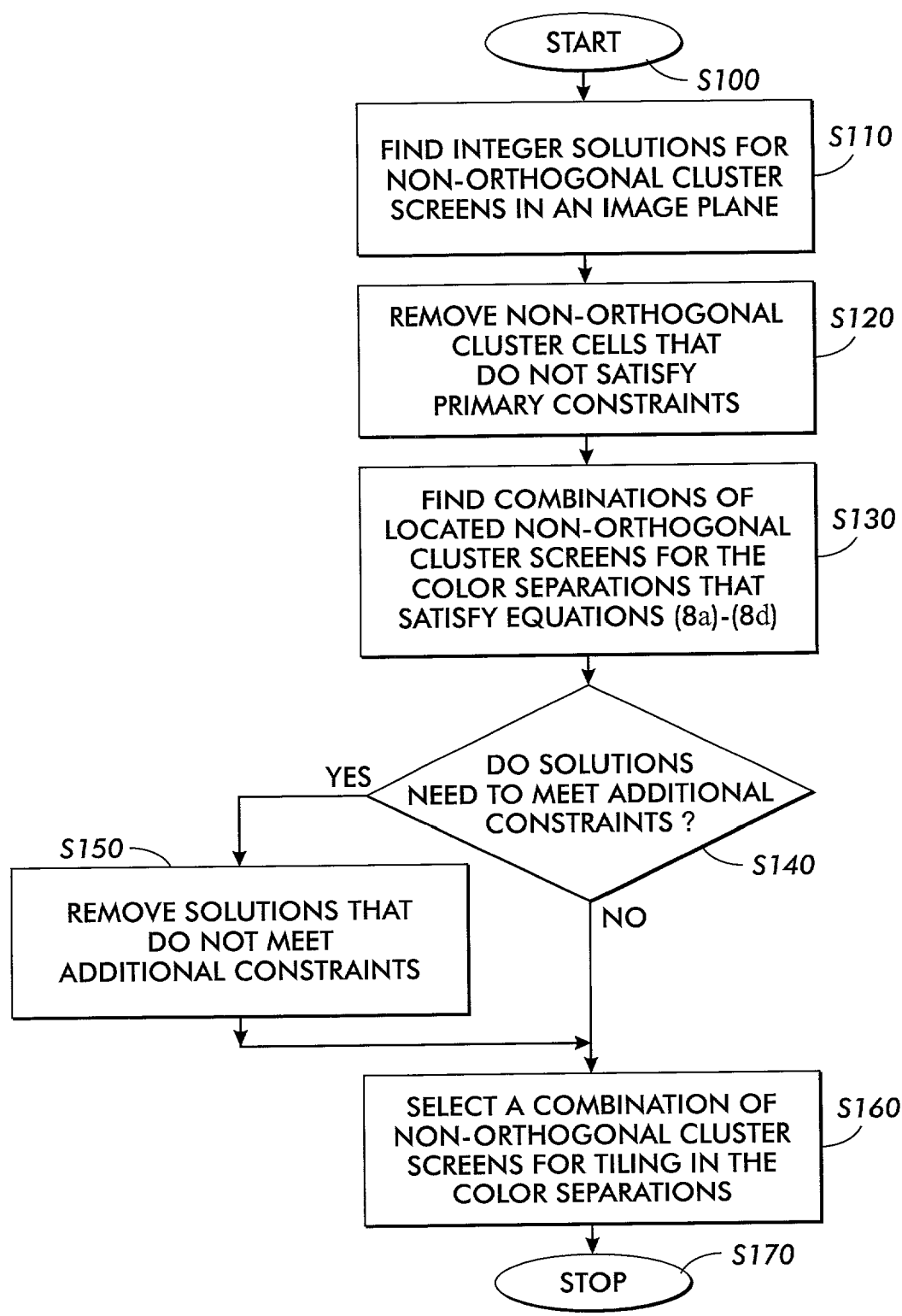
FIG. 5 is a flowchart outlining one exemplary embodiment of a method for determining a combination of non-orthogonal single-cell halftone screens according to this invention that will provide at least substantially moiré-free color halftoning.

Consequently, the substantially moiré-free halftone screens formed from non-orthogonal cluster cells can be used in a color halftone printing process. For, example, FIG. 5 is a flowchart outlining a first exemplary embodiment of a process, according to this invention, for determining a set of non-orthogonal halftone cluster screens for three color separations to perform substantially moiré-free color halftone printing.

Beginning in step S100, control proceeds to step S110, where all non-orthogonal halftone cluster cells having integer values for $x_1$, $y_1$, $x_2$ and $y_2$ are found. Then, in step S120, those non-orthogonal halftone cluster cells found in step S110 that do not satisfy one or more primary constraints, such as, for example, having an area that is smaller than a specified maximal area, Amax, are removed from the solutions set. In various exemplary embodiments, these primary constraints can include requiring the non-orthogonal halftone cluster cell to have both diagonals longer than all the sides of that non-orthogonal halftone cluster cell. Next, in step S130 combinations of any three remaining non-orthogonal halftone cluster cells that satisfy the three color moiré-free condition, defined in Eqs. (8a)–(8d), are identified. Control then continues to step S140.

In step S140, a determination is made whether any additional constraints are to be applied. Such additional constraints can contain, for example, frequency ranges, additional color moiré constraints, printer limitations, etc. If no additional constraints are identified, the control jumps to step S160. Otherwise, if the identified combinations are required to meet at least one additional constraint, the control continues to step S150.

In step S150, those identified combinations of non-orthogonal halftone cluster cells that do not meet the additional constraints are removed from the identified combinations of non-orthogonal halftone cluster cells. Then, in step S160, one of the remaining combinations of non-orthogonal halftone cluster cells is selected and each of the various non-orthogonal halftone cluster cells of the selected combination are associated with one of the various color separations. The method then ends in step S170.

It should be appreciated that, while the above-outlined method has been described in terms of finding solutions to Eqs. (8a)–(8d), which describe four integer equations containing components corresponding to three separation colors, such as, for example, cyan, magenta, and black, it should be apparent that Eqs. (8a)–(8d) can be also used for any other color combinations. Further, Eqs. (8a)–(8d) can be expanded or reduced to include greater or lesser number of separation colors, as desired. Accordingly, combinations of more than or less than three non-orthogonal halftone cluster cells can be found in step S130 without departing from the spirit and scope of the invention. It is apparent that the above process may be readily implemented in software that can be used in a variety of hardware systems.

The above exemplary procedures for generating moiré-free non-orthogonal cell halftone screens, as illustrated in FIGS. 1–5, can be further supplemented by combining the above discussed non-orthogonal cell halftone screens with one or more line screens, as discussed below.

Figure 6:
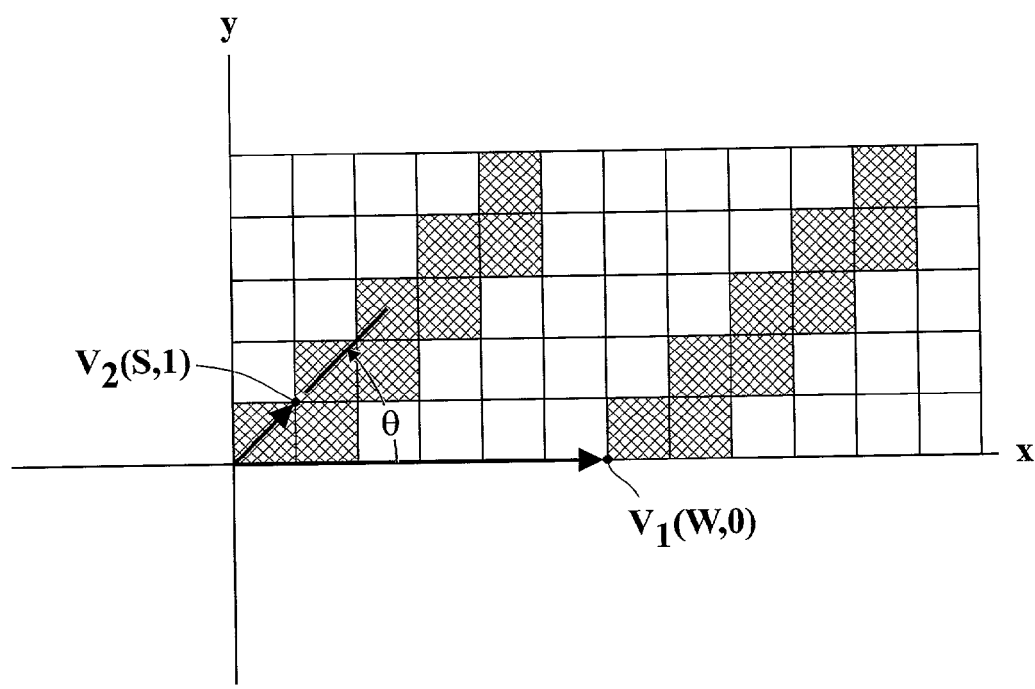
FIG. 6 illustrates a two-dimensional spatial vector representation of a line screen.

It is well understood in the halftone art that a line screen is considered a degenerate form of a halftone cell. That is, the spatial representation of a digital line screen can be given by two vectors, $V_1(W,0)$ and $V_2(S,1)$, as illustrated in FIG. 6, or as expressed in their spatial components as:

$$x_1 = W, \tag{12a}$$

$$y_1 = 0, \tag{12b}$$

$$x_2 = S, \tag{12c}$$

$$\text{and } y_2 = 1. \tag{12d}$$

where,

The line screen is represented as a tile with height 1, width W and shift S. Thus, W represents the width of the representing tile;

1 represents a default height of the tile; and

S determines the tilt angle of the line screen from the y-axis.

The area A of the line segment specified by $V_1$ and $V_2$ given by Eqs. (12a)–(12d) can be calculated using Eq. (2b), to arrive at:

$$A = W. \tag{13}$$

Figure 7:
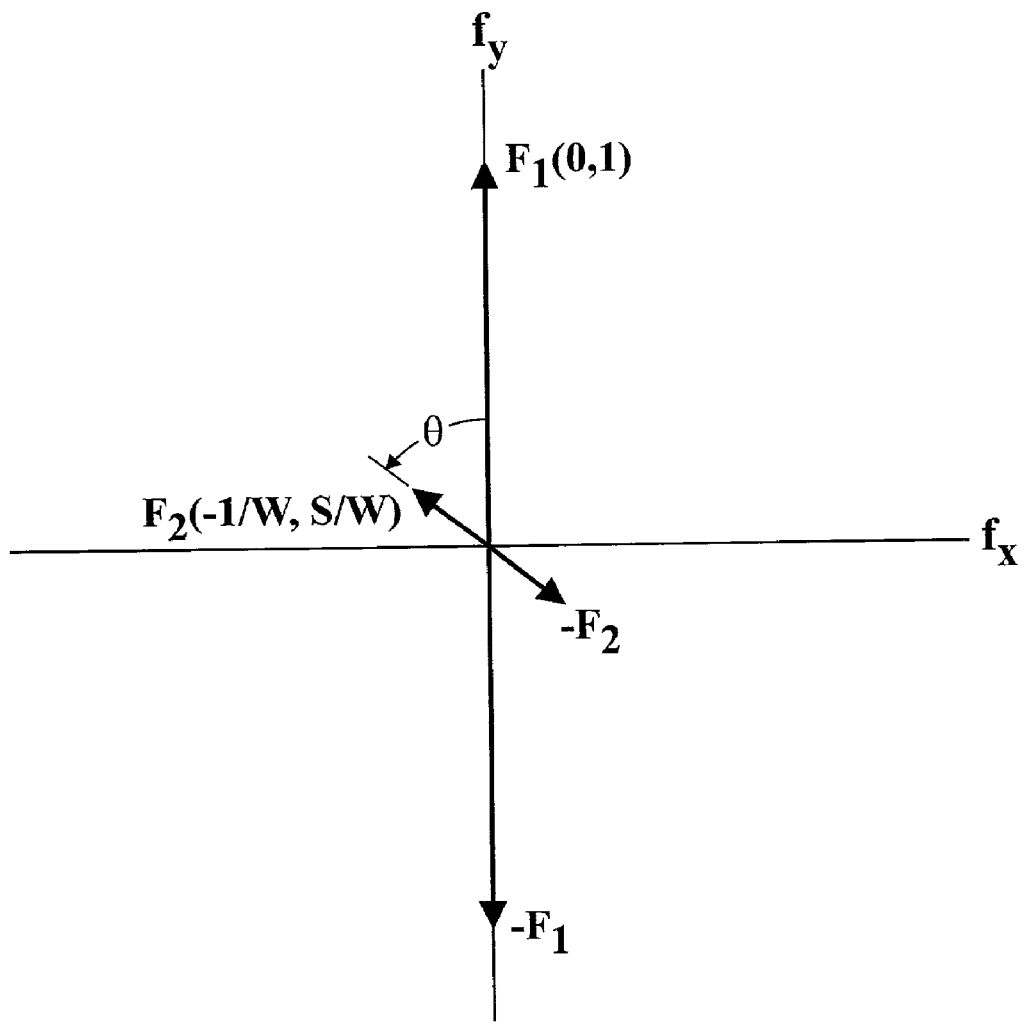
FIG. 7 illustrates a frequency domain representation of the line screens shown in FIG. 6.

FIG. 7 illustrates the vectors $F_1$ and $F_2$, in the frequency domain that represent the line screen shown in FIG. 6. Using the relationships provided in Eqs. (4a) and (4b), the frequency components of $F_1$ and $F_2$ can be calculated to arrive at the following result:

$$f_{x_1} = 0, \tag{14a}$$

$$f_{y_1} = 1, \tag{14b}$$

$$f_{x_2} = -1/W, \tag{14c}$$

$$f_{y_2} = S/W. \tag{14d}$$

It can be seen from FIG. 7 that the vector $F_1(0, 1)$ is a frequency vector that lies on the y-axis and has the highest frequency possible, i.e., 1/pixel, which, according to sampling theory, corresponds to a zero frequency in the frequency domain representation. In other words, the frequency representation of a line screen can be simply represented by the sole vector $F_2$ and its conjugate. Therefore, the three-color moiré-free condition specified by the two Eqs. (5a) and (5b) can be reduced to one equation, if one line screen is used to replace a non-orthogonal cluster screen. For example, if it is assumed that the sole frequency vector of a cyan line screen is given by $F_{c2}$, then the vector relationship for the three-color moiré-free condition for a combination of this line screen, $F_{c2}$, with two other, for example, magenta and black, non-orthogonal cluster screens, $F_{m1}$ and $F_{m2}$, and $F_{k1}$ and $F_{k2}$, respectively, can be rewritten as follows:

$$F_{c_2}+F_{m_2}+F_{k_2}=0 \tag{15}$$

It is apparent that the above-outlined moiré-free condition in Eq. (15) is unchanged even if several single-cell cluster screens are replaced by line screens.

Further, the moiré-free condition specified by the vector equation, Eq.(15), can also be expressed by two scalar equations, which are identical to Eqs. (8c) and (8d) and rewritten below as:

$$A_m A_k x_{c2}+A_c A_k x_{m2}+A_c A_m x_{k2}=0, \text{ and} \tag{8c}$$

$$A_m A_k y_{c2}+A_c A_k y_{m2}+A_c A_m y_{k2}=0, \tag{8d}$$

where the areas Ac, Am and Ak are given by Eqs. (8e)–(8g).

In the above-outlined discussion, the line screen defined by the two vectors, $V_1(W,0)$ and $V_2(S,1)$, represents a set of line screens, which are tilted from the y-axis. It should be appreciated that another set of line screens, which are tilted from the x-axis, can be defined by two vectors, $V_1(0,W)$ and $V_2(1,S)$ and can be equally applied in the above-outlined equations.

It is readily apparent that the moiré-free condition, specified by the vector equation, Eq. (15), and the two scalar equations, Eqs. (8c) and (8d), can be applied to any combination of non-orthogonal cluster screens that includes one or more line screens.

Figure 8:
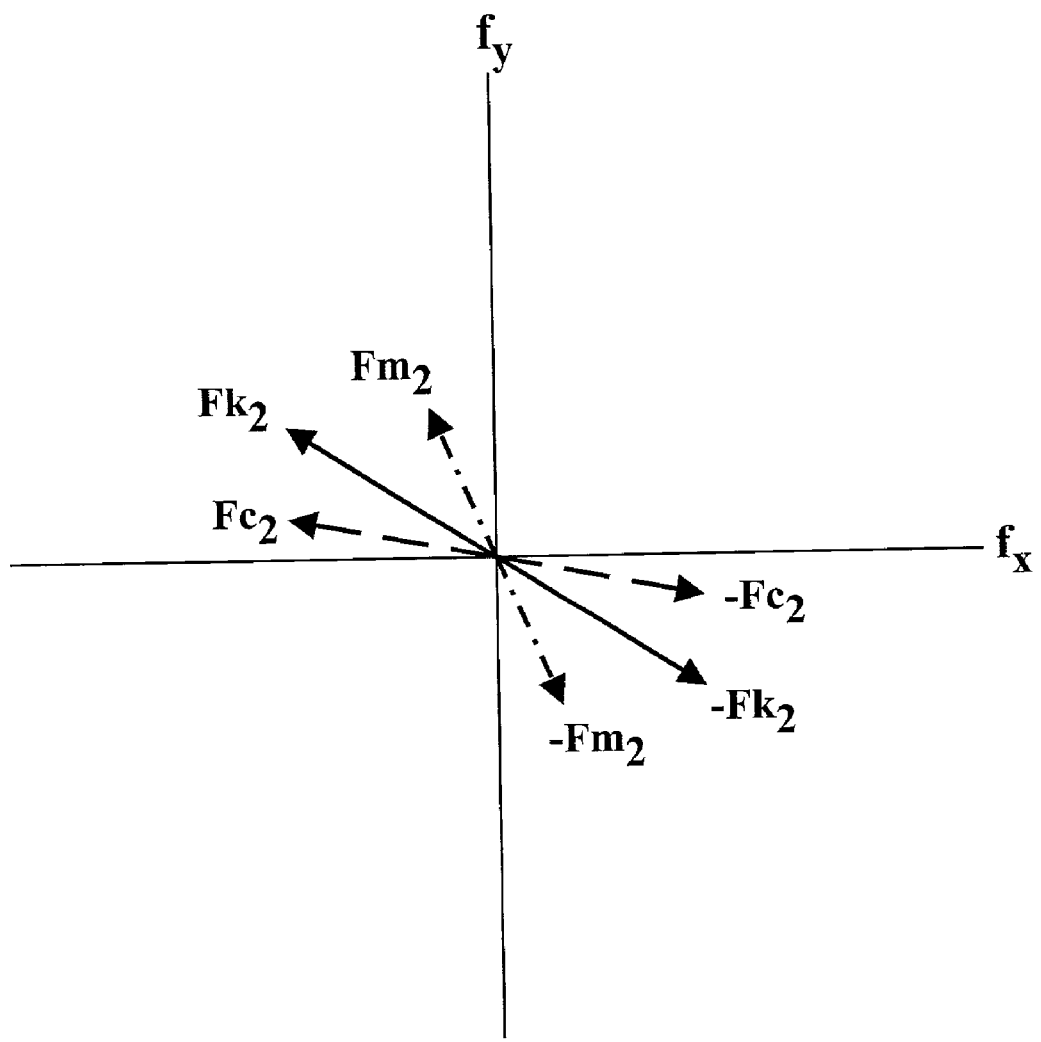
FIG. 8 illustrates a frequency domain representation of the nonzero frequency vectors for three line screens.

FIG. 8 provides, for example, a vector diagram of three line screens in the frequency domain, corresponding to the $F_{c2}$, $F_{m2}$, and $F_{k2}$ vectors of Eq. (15). It is apparent that, similarly to the analysis previously discussed for non-orthogonal cluster screens, the line screens and non-orthogonal cluster screens corresponding to the solutions for Eqs. (15), (8c) and (8d) can also be used to provide moiré-free halftoning.

Figure 9:
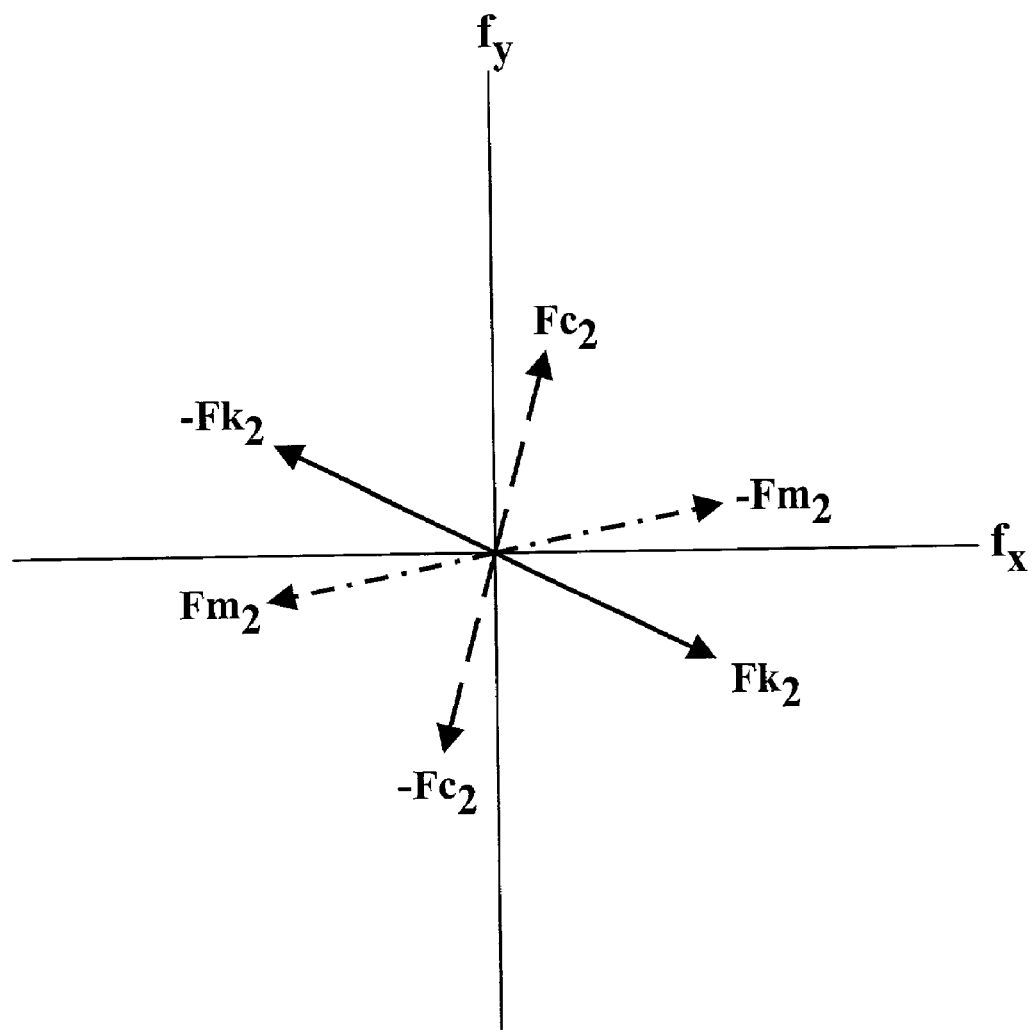
FIG. 9 illustrates a frequency domain representation of a combination of two single-cell halftone screens and a line screen according to an exemplary embodiment of this invention.

FIG. 9 illustrates, in the frequency domain, a moiré-free condition corresponding to Eq. (15) for an exemplary combination of a line screen in a cyan ($F_{c1}$ and $F_{c2}$) color separation and two cluster screens in the magenta ($F_{m1}$ and $F_{m2}$) and black ($F_{k1}$ and $F_{k2}$) color separations, respectively. The exemplary arrangement of line screen and cluster screens frequency vectors in FIG. 9 can be contrasted to FIG. 4, which illustrates in the frequency domain the exemplary moiré-free conditions for the all-cluster screen case.

It is apparent that even if only one line screen is combined with two other parallelogram cluster screens, the moiré-free conditions can be reduced to one vector equation, Eq. (15). Therefore, the combination of line screens and non-orthogonal cluster screens provides extra degrees of freedom in selecting suitable screen solutions.

Figure 10:
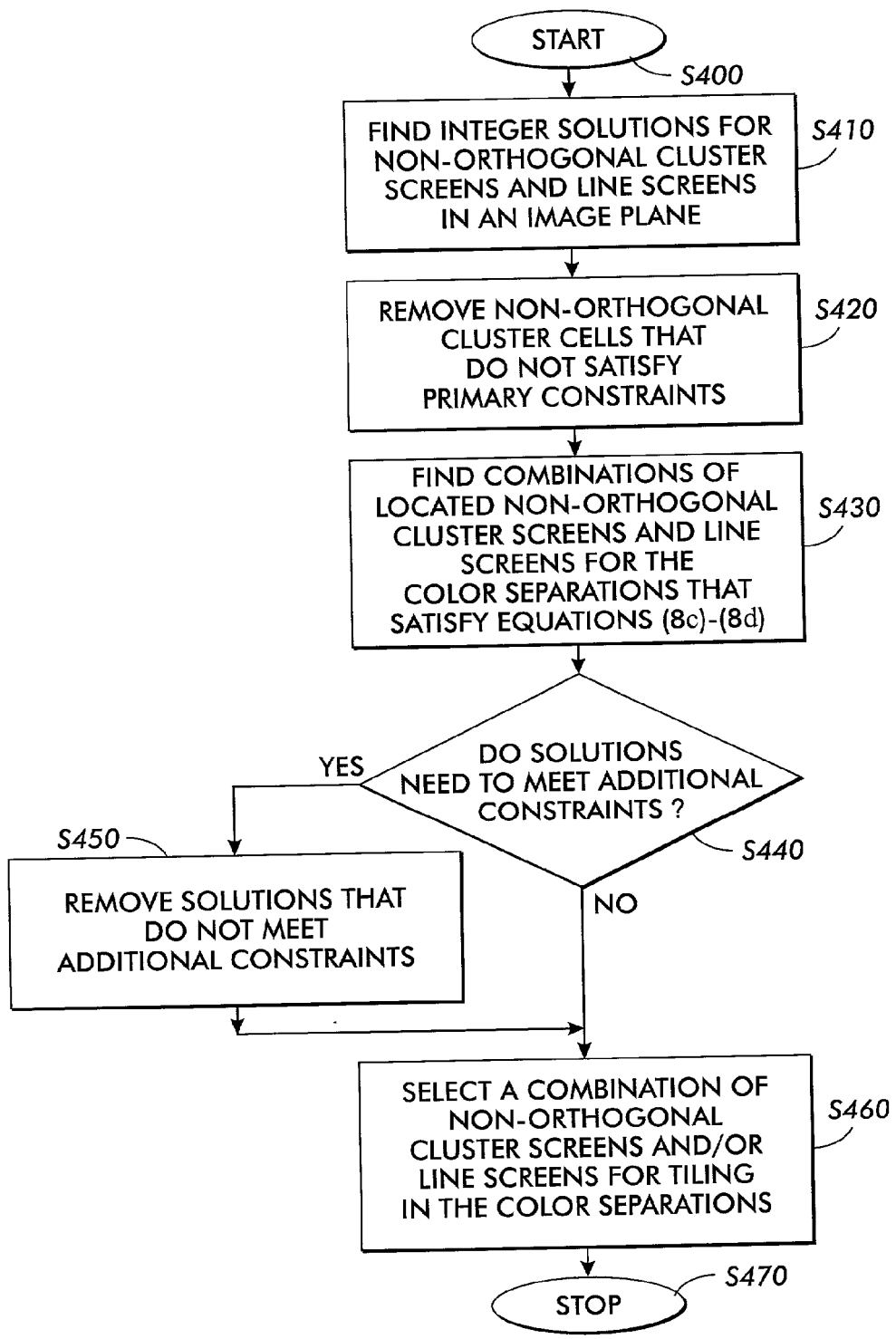
FIG. 10 is a flowchart outlining one exemplary embodiment of a method for determining a combination of non-orthogonal cluster screens and line screens according to this invention that provide at least substantially moiré-free color halftoning.

FIG. 10 is a flowchart outlining an exemplary embodiment of a process, according to this invention, for combining non-orthogonal single-cell cluster screens with line screens to form substantially moiré-free halftoning.

Beginning in step S400, control proceeds to step S410, where all non-orthogonal halftone cluster cells having integer values for $x_1$, $y_1$, $x_2$ and $y_2$ are found. As line screens can be treated as special cases of non-orthogonal parallelograms, i.e., degenerate parallelograms, all possible line screens solutions can also be obtained from the non-orthogonal halftone cluster cells found in step S410. Of course, for non-orthogonal cells, the analysis includes calculation on both frequency components (e.g., $F_1$ and $F_2$). In step S420, those non-orthogonal halftone cluster cells found in step S410 that do not satisfy one or more primary constraints are removed from the solutions set. In various exemplary embodiments, these primary constraints can include requiring a non-orthogonal halftone cluster cell to have both diagonals longer than all the sides of that non-orthogonal halftone cluster cell. Next, in step S430, any combinations of non-orthogonal halftone cluster screens and line screens that satisfy integer equations (8c) and (8d) are identified. Control then continues to step S440.

In step S440, a determination is made whether any additional constraints are to be applied. Such additional constraints can contain, for example, frequency ranges, multi-color moiré constraints, printer limitations, etc. If no additional constraints are identified, control jumps to step S460. Otherwise, if the identified combinations are required to meet at least one additional constraint, control continues to step S450.

In step S450, those identified combinations of non-orthogonal cells that do not meet the additional constraints are removed from the identified combinations of non-orthogonal cells. Then, in step S460, one of the remaining combinations of non-orthogonal halftone cluster cells and line screen cells is selected and each of the various halftone screens is associated with each of the color separations. The method then ends in step S470. It is apparent that the above-outlined method may be readily implemented in software that can be used in a variety of hardware systems.

It should be appreciated that the above-outlined exemplary procedures can be modified with many different alternatives or variations as apparent to those skilled in the art. For example, other constraints in addition to cell size may be used. Likewise, the solution sets may be sorted or further constrained according to size, positioning, angles, hardware characteristics, or the like.

It should be appreciated that, while the exemplary embodiments of this invention include various primary and additional constraints, it should be apparent that the primary and/or the additional constraints may include the null set. That is, various exemplary embodiments of this invention may identify and/or select combinations of non-orthogonal cluster cells or line screens without applying any primary constraints and/or additional constraints, as desired.

The above-outlined process is described in terms of finding solutions to Eqs. (8c) and (8d), which describe a set of equations where the components of the solutions are differentiated according the different separation colors of cyan, magenta, yellow, and black, for example. However, it should be apparent that Eqs. (8c) and (8d) can be expanded or reduced to include greater or lesser number of separation colors, as desired. Accordingly, solutions and combinations of more than or less than the set of parallelograms and/or line screens corresponding to the number of color separations can be found in step S410 without departing from the spirit and scope of the invention.

As an example of the exemplary method of FIG. 10, two non-orthogonal parallelogram halftone cells for the cyan and magenta color separations, and one halftone line screen for the black color separation, can be combined for at least substantially moiré-free three-color halftoning. With a 600×600 dpi printer, the systems and/or methods according to this invention provide the following halftone results:

$$\text{Cyan: } 145.71 \, pi \text{ at } 11.3° \text{ and } 117.81 \, pi \text{ at } -76°;$$ (16)

$$\text{Magenta: } 145.71 \, pi \text{ at } 78.7°; \text{ and } 117.81 \, pi \text{ at } -14°;$$

$$\text{Black: } 121.21 \, pi \text{ at } 45°.$$

The equivalent halftone parallelogram/line screen structures are given by:

$$v_{c_1}: (5, 1),$$ (17)

$$v_{m_1}: (1, 5), \quad v_{m_2}: (-4, 1),$$

$$v_{k_1}: (7, 0), \quad v_{k_2}: (1, 1).$$

Figure 11:
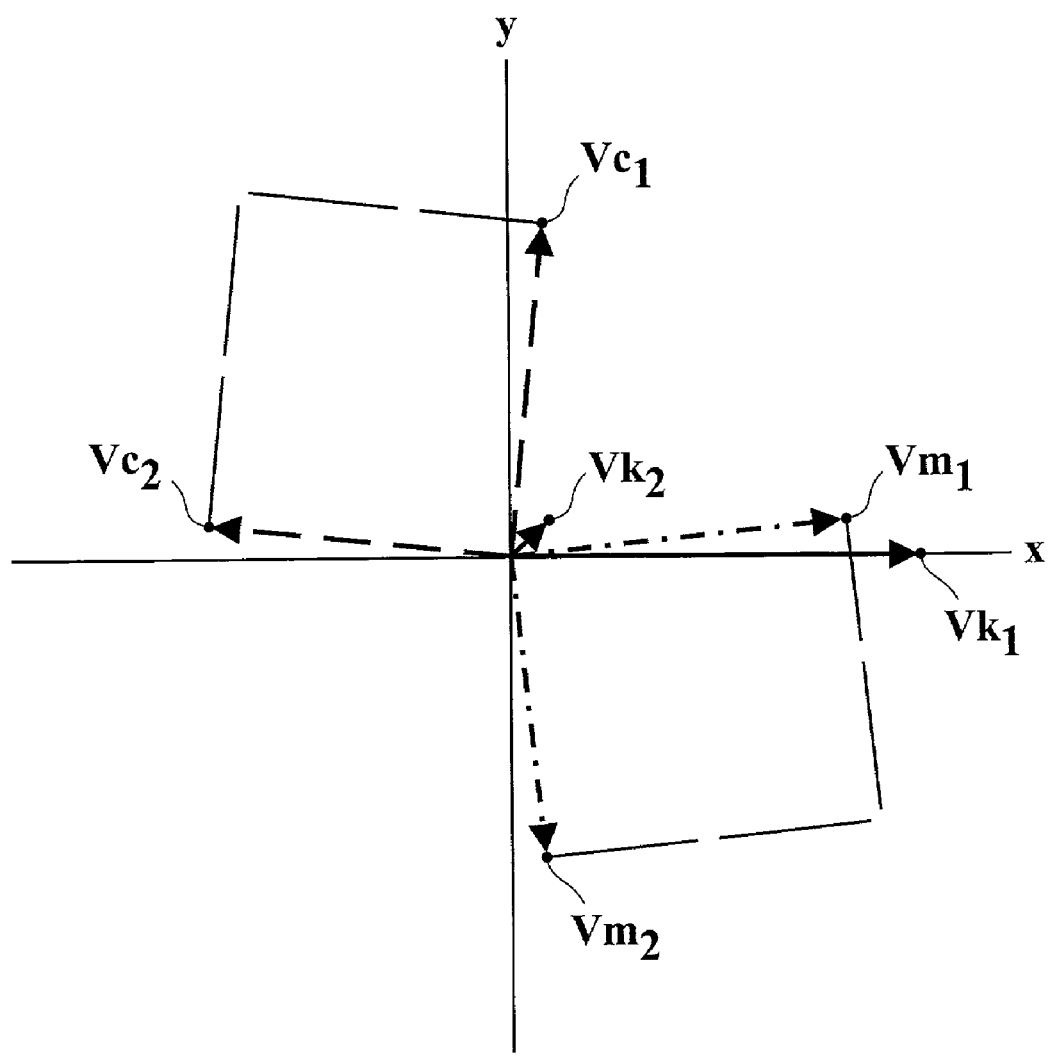
FIG. 11 illustrates a spatial domain representation of a combination of non-orthogonal parallelogram cells and line screens according to an exemplary embodiment of this invention.

FIG. 11 illustrates, in the spatial domain, the relationships of Eq. (17) according to an exemplary embodiment of this invention. It should be appreciated from FIG. 11, that the cyan-magenta-black combination satisfies the zero moiré condition defined by Eqs. (8c), (8d) and Eq. (15).

Though the above exemplary procedures describe solution sets according to the moiré-free equations described above, it is apparent that equally desirable solution sets can be found by replacing the right hand side of the moiré-free equations with an arbitrarily small number or by suitably altering the quantity or expression of the parameters of the moiré-free equations without departing from the spirit and scope of this invention. Furthermore, depending on the characteristics of a marking device or print engine and the size and shape of cells that make up constituent screens of a screen set, moiré frequencies above about forty to sixty cycles per inch are considered above an objectionable range. Therefore, the right hand side of the moiré-free equations can also be replaced with a value above a first or high-end objectionable frequency threshold without departing from the spirit and scope of this invention. Moiré frequency vectors below the visual range are said to be zero vectors or near zero vectors. Moiré frequency vectors above the objectionable range or threshold value are said to be high frequency vectors. Near zero frequency is a term known in the art to mean frequencies low enough that their effect is unobjectionable. Near zero frequency vectors are those with a frequency magnitude below a second or low-end objectionable frequency threshold. For example, frequencies with periods beyond the dimensions of an image are generally unobjectionable and inconsequential. Additionally, while the exemplary embodiments describe solutions for the color separations of cyan, magenta, and black, other colors or combinations of colors, as desired, can be substituted. Also, more or less than three color separations can be utilized as desired.

Further, while the exemplary embodiments refer to solution sets as principally containing non-orthogonal, parallelogram-shaped cluster cells, it should be appreciated that the exemplary embodiments according to this invention can also be applied to non-parallelogram shaped cells. For example, squares, rectangles, triangles, ellipses, oblate or prolate shapes, trapezoidal shapes or the like, where the outer boundary of the respective shape is substantially contained within the angles formed by the representative halftone cell vectors, can be used.

Figure 12:
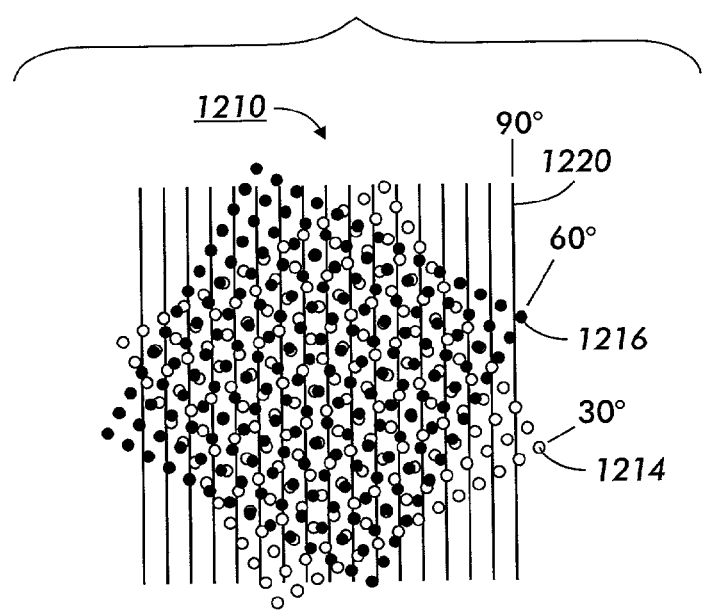
FIG. 12 is an illustration of a first set of orthogonal screens including two dot screens and a line screen.

For example, referring to FIG. 12, a first set of screens 1210 includes two orthogonal clustered dot screens 1214. 1216 and an orthogonal line screen 1220 oriented at 30, 60 and 90 degrees respectively.

In some embodiments, line screens may optionally be a hybrid line screens. Hybrid line screens are beneficially applied to improve stability in highlights and shadow. However, hybrid line screens contain additional and/or changing frequency components. Therefore, the selection of hybrid line screen frequencies and orientation angles is more complicated. Nevertheless, the general process is the same as that disclosed here.

Figure 13:
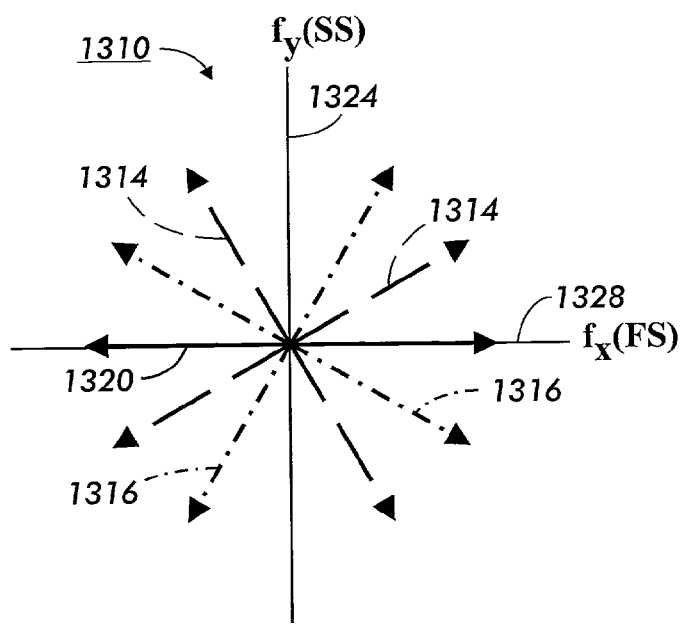
FIG. 13 shows a set of frequency vectors associated with the first set of orthogonal screens.

FIG. 13 illustrates a representative set 1310 of fundamental frequency vectors 1314, 1316, 1320 associated with the first set 1210 of orthogonal screens (with a non-hybrid line screen). Additionally, FIG. 13 relates the frequency vectors to slow 1324 and fast scan 1328 directions in a particular print engine. In the particular print engine the Y direction is related to a slow scan direction, or the direction in which a photoreceptor is indexed or moved during a rendering process. The X direction is related to a fast scan direction, or the direction of a beam sweep in, for example, a xerographic environment. These directions are known to be associated various kinds of process generated frequency components that can combine in undesirable ways with the frequency components of halftone screens. For example, to reduce interaction with so-called banding effects, it is beneficial for the length of lines in a line screen to run in the slow scan direction.

A review of FIG. 13 reveals that the frequency vectors of the first screen set would combine (in a manner similar to that illustrated in FIG. 4) to satisfy Eq. 15. Therefore, the first set 1210 of orthogonal screens combine in a substantially moiré free manner. Furthermore, if the 30, 60 and 90 degree screens 1214, 1216, 1220 are associated with cyan, black and magenta respectively, then the first set of orthogonal screens are beneficially applied to marking engines and image writers that have artifacts that normally beat against the traditional 45 degree black screen. For example, the first set of orthogonal screens 1210 is beneficially applied to marking engines that exhibit process effects such as, the dual beam misalignment effect mentioned earlier. The dual beam effect normally beats against the traditional 45-degree black screen, creating objectionable moiré. Since the traditional 45-degree black screen is not a component of the first orthogonal screen set 1210, the interaction with the dual beam effect is reduced or eliminated. As will be explained in greater detail in reference to FIG. 18, the exemplary process effect (dual beam effect) beats against the line screen to generate a moiré pattern with a frequency that is outside the objectionable range. At the same time, since the frequency vectors of the first orthogonal screen set combine through vector addition to yield a zero vector, the first orthogonal screen set maintains the beneficial characteristics of the traditional screen set.

The choice of angular orientations and frequencies shown in FIG. 12 and FIG. 13 is exemplary only. Other screen sets that satisfy equations similar to Eq. 15 can be found. Furthermore, other screen frequencies and screen frequency relationships can be used. The only restriction is that the frequency vectors of the screens in question, and optionally, any machine related phenomena (process effects), combine to yield moiré vectors that represent frequencies that are above or below the objectionable range. Additionally, the association of colorants with particular screens is also exemplary. The screens can be associated with other colorants. In the example above, magenta was associated with the line screen because magenta is the lightest of the three colorants in discussion, and in some applications, it is desirable to de-emphasize the line screen by associating it with the lightest colorant. An alternate strategy is to associate the line screen with the darkest colorant (black). For instance, where a print engine exhibits a high degree of banding and/or process-direction perturbations, associating the line screen with the darkest colorant can reduce that colorants sensitivity to the perturbations. Since the darkest colorant is the most visible or noticeable colorant it can be desirable to take steps to reduce the darkest colorants sensitivity to perturbations.

Until now, methods to reduce moiré by using screens with frequency components that combine to yield zero or near zero moiré frequency vectors have been discussed. However, as mentioned above, moire is also rendered unobjectionable when the frequency components of the moiré are above the visible or objectionable range.

Preferably, halftone screen frequencies are above the visible or objectionable range. Therefore, where screen frequency vectors combine to yield a moiré frequency vector that is larger (or higher in frequency) than the component screen frequency vectors, moiré is rendered unobjectionable.

Figure 14:
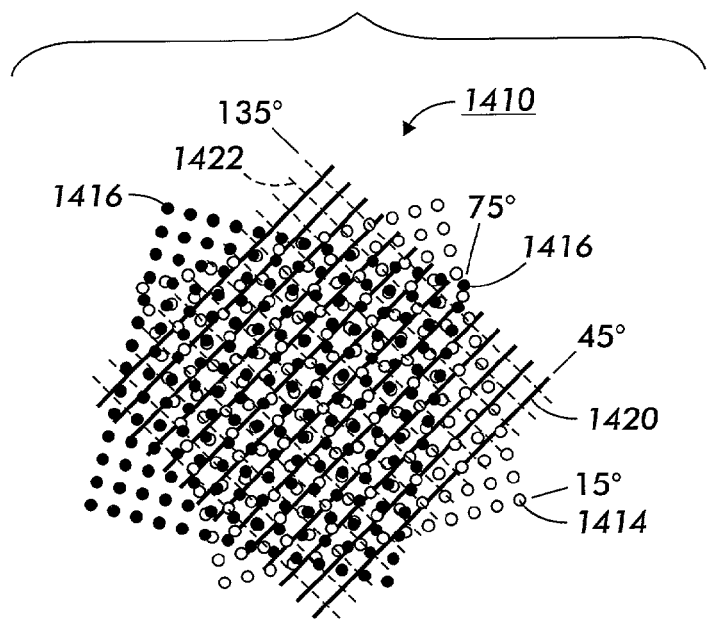
FIG. 14 is an illustration of a second set of orthogonal screens including two dot screens and two line screens.
Figure 15:
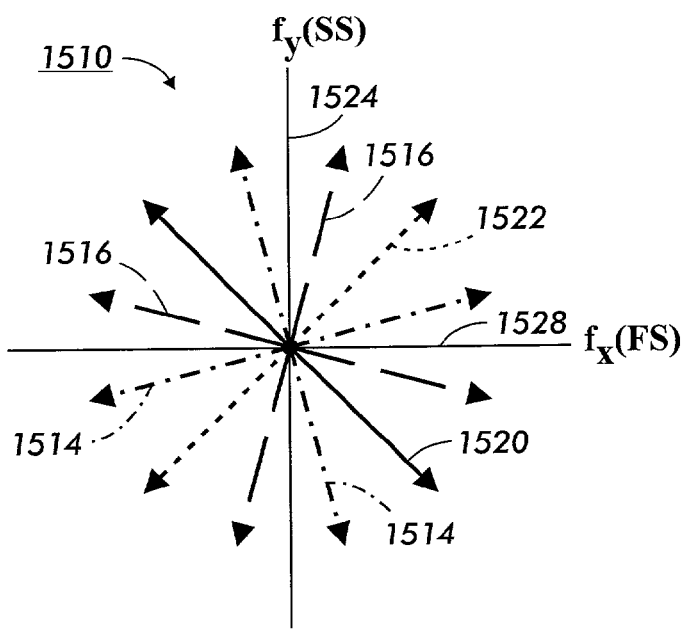
FIG. 15 shows a set of frequency vectors associated with the second set of orthogonal screens.

Referring to FIG. 14, a second set of orthogonal screens 1410 includes two orthogonal clustered dot screens 1414, 1416 and two orthogonal line screens 1420, 1422 oriented at screen angles of 15, 75, 45 and 135 degrees respectively. FIG. 15 illustrates a representative set 1510 of fundamental frequency vectors associated with the second set 1410 of orthogonal screens. Again, FIG. 15 relates clustered dot frequency vectors 1514, 1516, and line screen frequency vectors 1520, 1522 to slow 1524 and fast scan 1528 directions in a particular print engine. Again, the line screens can optionally be hybrid line screens.

In at least some image-on-image xerographic environments, the moiré caused by the process effects, such as development suppression, and spectral overlap of a yellow colorant and a black colorant can be a significant problem. The illustrated second set of orthogonal screens can be used to combat that moiré problem. For example, in those image-on-image xerographic environments, if cyan and magenta are associated with the clustered dot screens 1414, 1416 at 15 and 75 degrees respectively and black and yellow are associated with the line screens 1420, 1422 at 45 and 135 degrees respectively then all significant moiré patterns can be reduced in magnitude or eliminated entirely. As can be determine from examining FIG. 15, frequency vectors of black and yellow line screens 1520, 1522 combine to yield a moiré frequency vector with a magnitude greater than the magnitude of the component screen vectors. Therefore, the frequency of the resulting development suppression or spectral overlap moiré pattern is likely to be above a visible limit and the moiré is rendered unobjectionable. Furthermore, with the second screen set 1410, the desirable effects of a 30-degree screen angle separation are maintained in the 15, 45, 75, and 135 degree orientation relationship. (Note that the angular separation between the 75 and 135 degree screens is 60 degrees and 60 degrees is rationally divisible by 30) and the screens themselves do not produce objectionable moiré.

A third set of orthogonal screens includes one orthogonal clustered dot screens and two orthogonal line screens. The third set of orthogonal screens is beneficially applied in rendering devices where, due to misalignment and distortion of raster lines, halftone screens can be printed at angles that slightly deviate from the intended or design angle. In such systems, if screen sets are selected to produce, for example, zero moiré frequency then the slight deviations mentioned above can lead to the production of pronounced moiré with low frequencies in the middle of the visible or objectionable range. On the other hand, if screen sets are selected so that the associated frequency vectors sum to high frequency moiré, the slight deviation due to the misaligned or distorted rasters only slightly changes the high frequency moiré. Changing a moiré frequency from one unobjectionable high frequency to another unobjectionable high frequency is, of course, quite acceptable. From the vector equations similar to the equations (8, 15) discussed earlier, vector diagrams can be plotted and used to easily find a set of screens that produce high frequency moiré, where one screen is a dot screen and two other screens are line screens.

For example, referring to FIG. 16, a frequency vector diagram 1610 for an exemplary third set of screens includes frequency vectors related to a first line screen 1614, a second line screen 1618 and a dot screen 1622, 1624. For instance, the first line screen is associated with a cyan (c) colorant, the second line screen is associated with a magenta (m) colorant and the dot screen is associated with a black (k) colorant. The exemplary screen angles and frequencies are as outlined below.

|   | Frequency (lpi) | Angle (degree) |
|---|---|---|
| C: | 152.98 | 60.64 |
| M: | 152.98 | −60.64 |
| K: | 167.71 | 26.57 |
|   | 167.71 | −26.57 |

As before, the vectors can be combined to test or determine the frequencies and angles of moiré generated by various combinations of screens from the set. For example, referring to FIG. 17, frequency vectors 1614, 1618, 1624 of the exemplary third screen set are redrawn and shown to combine to produce a three color moiré pattern with a frequency 1714 vector that is representative of an high moiré frequency in the Y direction. Similar diagrams can be drawn for other screen combinations. For example, moiré frequencies and angles for several combinations of the exemplary third screen set are outlined below.

|   | Frequency (lpi) | Angle (degrees) |
|---|---|---|
| 2-C moiré (C + K) |  |  |
| $C_1 + K_1$: | 76.83 | −12.53 |
| $C_1 + K_2$: | 95.01 | −37.87 |
| 2-C moiré (M + K) |  |  |
| $M_1 + K_1$ | 76.83 | 12.53 |
| $M_1 + k_3$: | 95.01 | 37.87 |
| 3-C moiré (C + M + K) |  |  |
| $C_1 + M_1 + K_2$: | 75 | 90.00 |
| $C_1 + M_1 + K_3$: | 75 | −90.00 |

The moiré frequencies produced by each of the outlined screen combinations from the exemplary third screen set are above the forty to sixty cycle ranges. Therefore, depending on an associated print engine or rendering device, the moiré produced by the outlined screen combinations would likely be considered unobjectionable.

Figure 18:
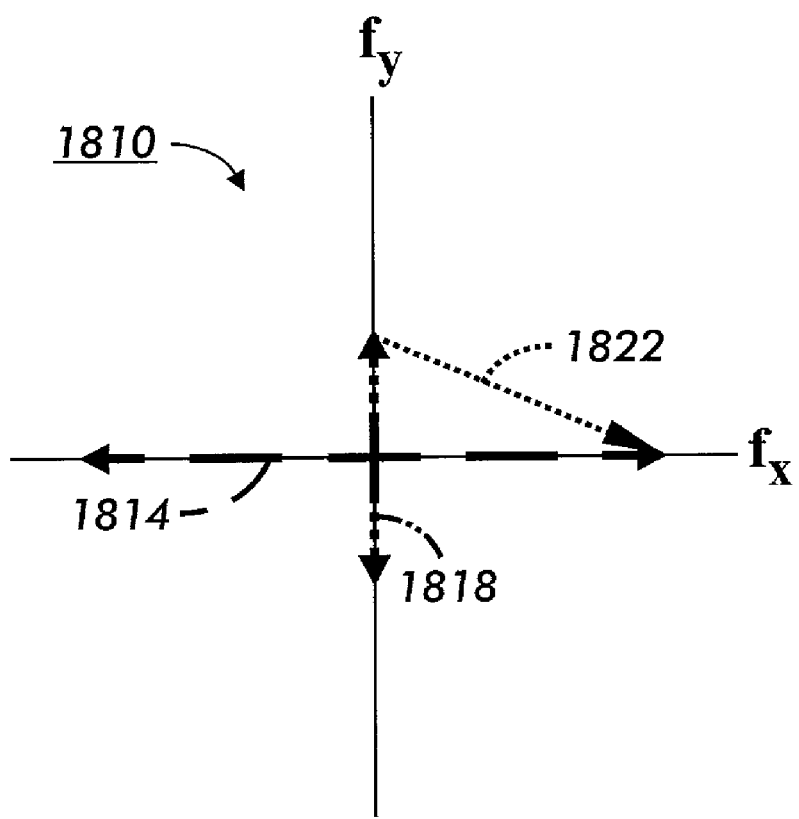
FIG. 18 is a vector diagram showing a moiré vector resulting from a process effect beating with an exemplary line screen.

As mentioned above, using line screens eases the process of avoiding frequency beating between halftone screens and process effect frequencies. Referring to FIG. 18, frequency components of a process effect can be represented by a marking process vector 1814. When a halftone screen set is selected to include a line screen 1818 with frequency vectors perpendicular to the frequency components from the process effect, the resultant beat or moiré frequency vector 1822 appears at relatively a high frequency and is often acceptable. For example, if the line screen vector 1818 is at 150 lpi @ 0 degrees, and the process effect vector 1814 is at 60 lpi @ 90 degrees, then the resultant beat or moiré frequency 1822 is at 161 lpi, which is above the forty to sixty cycles per inch range. Therefore, the resulting moiré is likely to be considered unobjectionable.

Referring to FIG. 12 and FIG. 13 in addition to FIG. 18, by combining a process effect frequency vector such as the process effect vector 1814 with, for example, the frequency vectors 1310 of the first selected screen set 1210 one can see that the process effect vector would combine with the line screen vector 1320 just as it combined with the line screen vector 1818. Therefore the line screen is relatively insensitive to the process effect. Additionally, it can be seen that the process effect vector 1814 combines favorably with the other vectors 1314, 1316 representing the fundamental frequency components of the other screens 1214, 1216 of the first screen set 1210.

Where line screens cannot be oriented in the process direction, for example, because more than one line screen is required, and it is not practical or useful to orient all the line screens in the same direction, it is preferable to orient line screens at angles above 45 degrees (where 0 degrees is defined as the fast scan direction, or the direction perpendicular to a process effect direction). Angles above 45 degrees are preferred because, as is known in the art, jagged edges are often formed on lines between 0 and 45 degrees. Line screens at angles higher than 45 degrees show less jaggedness than those line screens at lower angles. Jagged edges from line screens can introduce extra frequency components into the system, which might result in new moiré patterns. Additionally, jagged edges in line screens can add unwanted texture. Furthermore, the jagged edges are also more susceptible to marking process noise sources. Therefore, they tend to appear noisier. Of course, the reference to above to—45 degrees—refers to angles in the first quadrant. Those of ordinary skill in the art will understand that there are similar ranges of angles in other quadrants of frequency space that are related to similar characteristics with respect to line jaggedness.

Figure 19:
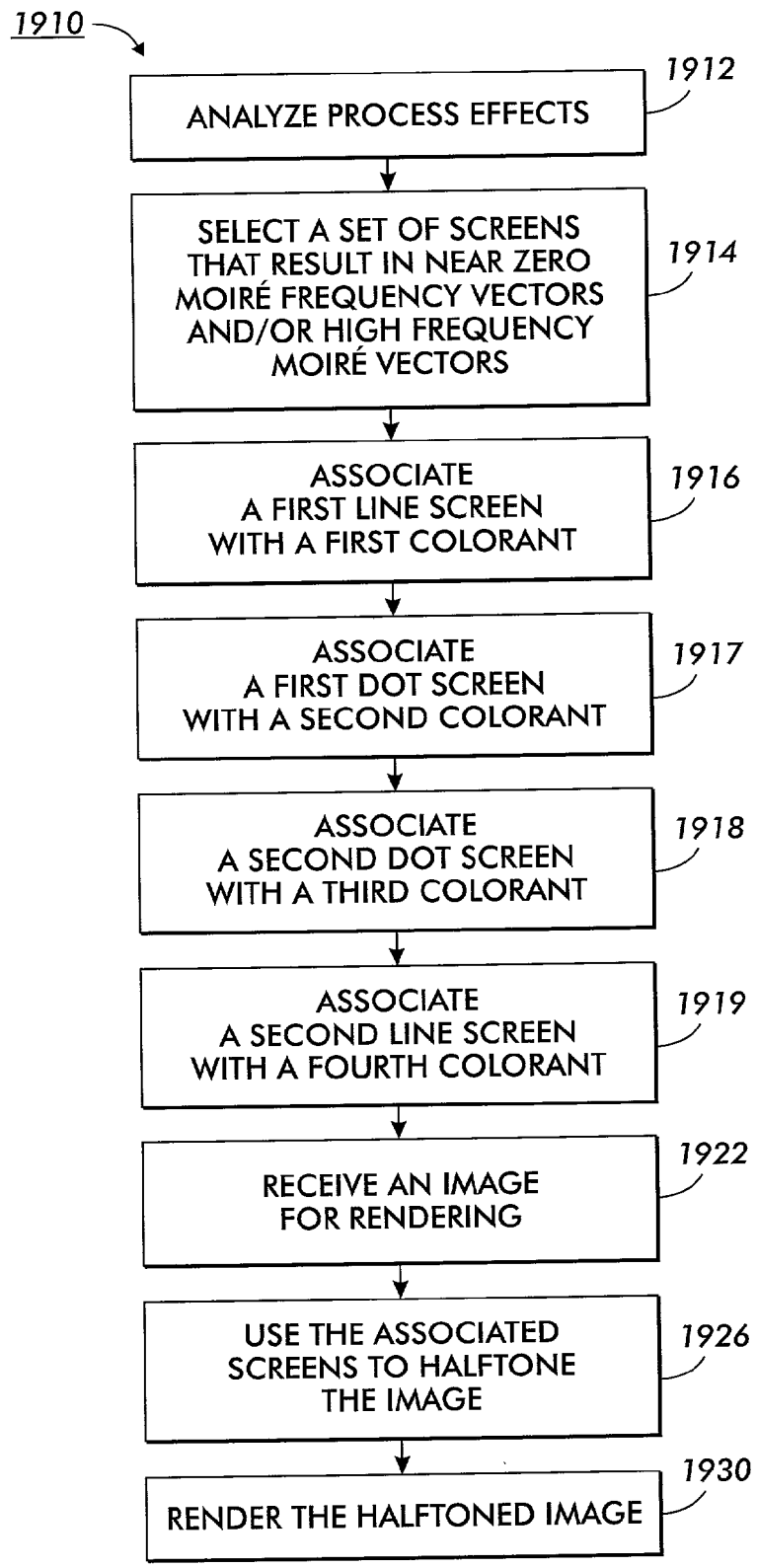
FIG. 19 is a flow chart outlining a method of halftoning and rendering a color image that avoids two and three color moiré; and, FIG. 20 is a block diagram of an image processor operative to perform the method of FIG. 16.

Referring to FIG. 19, in summary, a method 1910 of halftoning and rendering a color image, that avoids two and three color moiré, can begin with a process effect analization step 1912. In the process effect analization step 1912 process effects, characteristic of a target rendering device, are considered. For example directions and frequency components of effects, such as, for example, development order effects, dual beam effects, photoreceptor velocity non-uniformity effects, mirror wobble effects, and/or raster start position jitter effects, are determined.

In a screen set selection step 1914 a search is carried out to find a set of halftone screens having fundamental screen frequencies and screen angles that combine to produce zero or near zero moiré frequencies (below the visible range), or high moiré frequencies (above the objectionable range). As explained above, because line screens contribute fewer frequency components that other screen types, the search for an acceptable screen set is simplified by designating that the set includes at least one line screen. Additional screens can be designated to be line screens to further facilitate finding an acceptable screen set. Preferably, the number of line screens used is kept to a minimum. Where called for, one or more of the line screens may be hybrid line screens.

The search may be carried out by any appropriate method. For example, equations similar to Eqs. 8a–8 g that encompass the above stated criteria can be derived and solutions to the equations can be sought. Alternatively, frequency vector sets related to screen set candidates can be analyzed and tested for compliance with the above stated criteria. Additionally, the frequencies and direction angles of the process effects of the target rendering device, considered in the process effect consideration step 1912, can be included as constraints in the screen set selection process. For example, the interaction of dual beam effects, non-uniform motion and the like are considered and accounted for in the frequency vector analysis as described in reference to FIG. 18.

Once a screen set has been selected, colorants or color separations are associated with individual screens from the selected set, in, for example, a first line screen association step, a first dot screen association step, a second line screen association step and a second dot screen association step 1916–1919. In the screen association steps 1916–1919, interactions between colorants are considered as well as device dependant factors (process effects) that contribute to mechanical and optical moiré. For example, a spectral overlap of colorants and/or the desirability of emphasizing or de-emphasizing line screens is considered. Not all of the screen association steps are required. For example, in some embodiments, the method need only be applied to three colorants. Additionally in some embodiments one line screen is used, while in other embodiments two or more line screens are used. Therefore, one or both of the second line screen association step 1919 and the second dot screen association step 1918 may be skipped.

When colorants have been associated with respective screens from the selected screen set, an image is received in a color image reception step 1922. The image may be received from any image source. For example, the image may be received directly from an image authoring tool, via a computer network, from digital media, such as a magnetic or optical disk, or from the output of a document scanner. Whatever the source, the image is either in a raster format or a rasterized version is created through known rasterization processes. In the rasterization process or subsequent to the rasterization process, the image is separated into color planes related to the colorants previously associated with screens from the selected screen set.

In a rendering step 1926, each color separation is halftoned through the halftone screen of the related colorant and rendered in a rendering step 1930. The image is rendered through the use of a rendering device, such as, for example, a xerographic printer, a lithographic printer, an inkjet printer or other printer or display device. For example, the method is beneficially applied to at least some image-on-image xerographic printers and in many lithographic environments.

Figure 20:
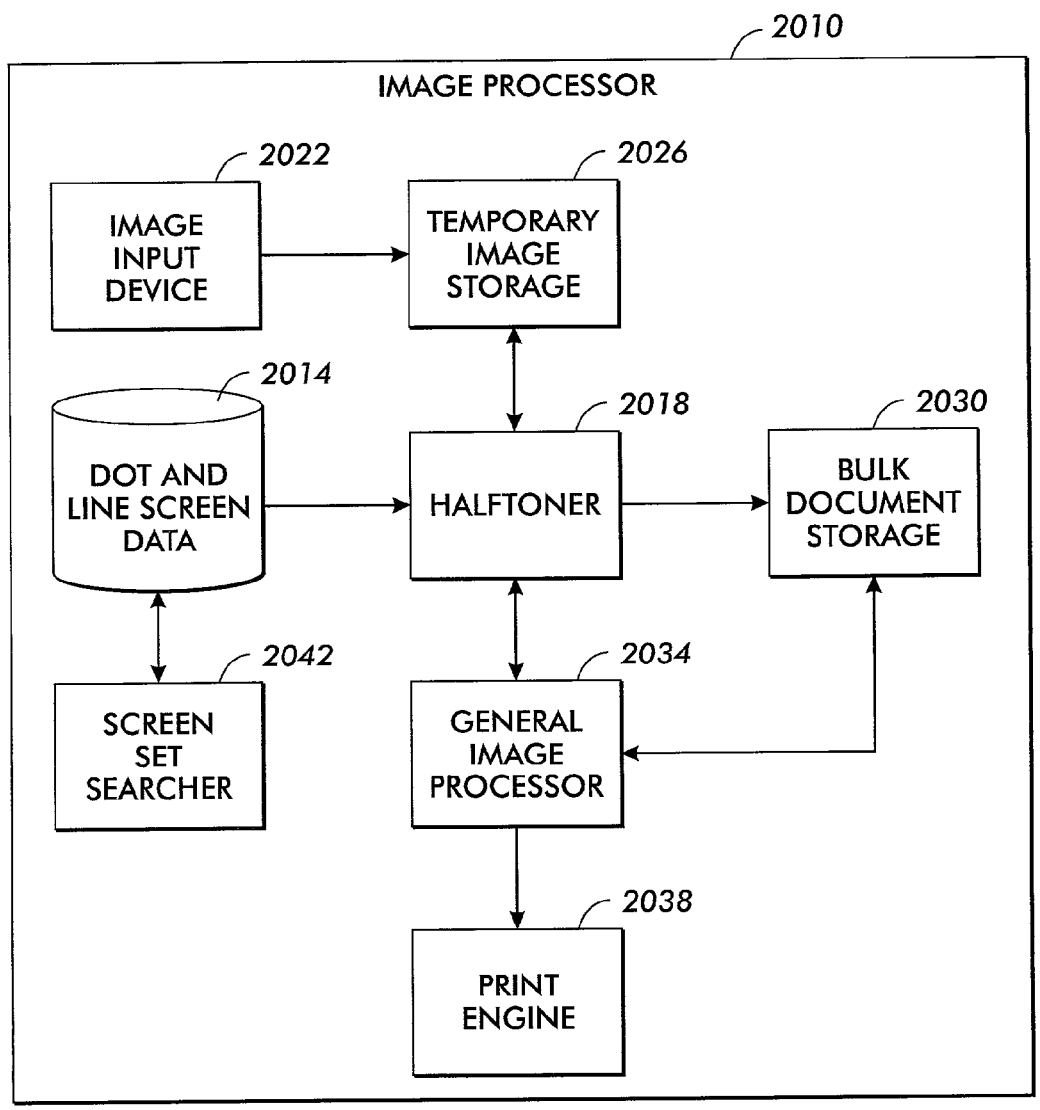

Referring to FIG. 20, an exemplary image processor 2010 operative to carry out the method 1910 of halftoning and rendering a color image that avoids two and three color moiré, includes a screen set repository 2014, a halftoner 2018, an image input device 2022, a temporary image storage device 2026, a long term or bulk storage device 2030, general image processor components and functions 2034, a rendering device 2038 and a screen set searcher 2042.

The image input device 2022 can be any image data source. For example, the image input device 2022 can be a scanner, electronic media reader such as, a disk drive, cdrom drive, or computer communications network connection. Whatever the source, image data is stored in the temporary image storage device 2026. The temporary image storage device 2026 is, for example, a computer memory.

The screen set repository 2014 preferably includes a non-volatile memory device. The screen set repository 2014 stores and provides access to a selected set of halftone screens, such as, a set of screens selected in the screen set selection step 1914. Preferably, the selected screens are predetermined and loaded into the screen set repository. The screen set selection may be based on characteristics and idiosyncrasies of, for example, the print engine 2038. Alternatively the screen set is selected in real time by the screen set searcher 2042. The screen set searcher 2042 selects a screen set based, for example, on rendering preferences determined, by a processor operator or other expert or agent (not shown). Again, the selection may be based on the characteristics of the print engine 2038. The halftoner 2018 reviews the image data in the temporary storage device 2026 and communicates with the selected screen set repository 2014 in order to compare the image data with threshold information stored in the selected screen set. The results of that comparison are passed, for example, to the general image processor functions 2034 and form the basis for the generation of control signals for operating the print engine 2038. Alternatively, the results of the comparison are stored in the bulk storage device 2030 for later processing.

The general image processor functions 2034 are known in the art to include editing and image enhancement functions as well as print engine communication functions. The general image processor 2034 may modify the information delivered from the halftoner 2018 or simply pass it directly to the print engine 2038.

The print engine can be any image-rendering device. In a xerographic environment, the print engine is a xerographic printer, such as an image-on-image xerographic printer. In a lithographic environment the print engine may be a lithographic printer, including, for example, printing plates etched through the use of the selected screen set. Xerographic printers are known to include a fuser, a developer and an imaging member or photoreceptor. Alternatively, the print engine 2038 may be another device, such as an electronic display or an inkjet printer.

Of course, image processors that are operative to carry out the method 1910 of halftoning can be implemented in a number of ways. In the exemplary image processor 2010, halftoner 2018, and the general document processor functions 2034 are implemented in software that is stored in a computer memory, and run on a microprocessor, digital signal processor or other computational device. Other components of the document processor are known in the art to include both hardware and software components. Obviously the functions of these modules can be distributed over other functional blocks and organized differently and still represent an embodiment of the invention.

The invention has been described with reference to particular embodiments. Modifications and alterations will occur to others upon reading and understanding this specification. For example, where line screens are mentioned, hybrid line screens may be used. Hybrid line screens include screens that are dot shaped in highlights, line shaped in mid-tones and hole shaped in shadow. Where the image processor is described as including a particular set of functional blocks in a particular organization, other functional blocks in other organizations may be substituted. For example, the halftoner may deliver the results of the comparison directly to the print engine. It is intended that all such modifications and alterations are included insofar as they come within the scope of the appended claims or equivalents thereof.

What is claimed is:

1. A method of halftoning a color image that avoids two and three color moiré, the method comprising the steps of:
   selecting a set of screens that have fundamental frequency vectors that combine to yield only moiré frequency vectors of types selected from the group consisting of zero frequency moiré frequency vectors, near zero frequency moiré frequency vectors and high frequency moiré frequency vectors;
   associating a first dot screen from the selected set of screens with a first colorant;
   associating a second dot screen dot screen from the selected set of screens with a second colorant;
   associating a first line screen from the selected set of screens with a third colorant;
   receiving the color image to be halftoned; and,
   halftoning the color image with the associated screens.

2. The method of halftoning a color image of claim 1 further comprising the step of:
   associating a second line screen from the selected set of screens with a fourth colorant.

3. The method of halftoning a color image of claim 1 wherein the step of: associating a first line screen with a third colorant comprises associating a first hybrid line screen with the third colorant.

4. The method of halftoning a color image of claim 2 wherein the step of: associating a second line screen with a fourth colorant comprises associating a second hybrid line screen with the fourth colorant.

5. The method of halftoning a color image of claim 1 wherein the step of: associating a first line screen with a third colorant comprises associating the first line screen with one of a cyan, magenta, and black colorant.

6. The method of halftoning a color image of claim 1 further comprising the step of: analyzing process effects and wherein the step of selecting a set of screens further comprises:
   selecting a set of screens having fundamental frequency vectors that combine with fundamental frequency vectors of the analyzed process effects to yield only moiré frequency vectors of types selected from the group consisting of zero moiré frequency vectors, near zero moiré frequency vectors and high frequency moiré frequency vectors.

7. The method of halftoning a color image of claim 1 wherein the step of: associating a first line screen with a third colorant comprises associating the first line screen with a black colorant and the method further comprises:
   orienting the first line screen in a direction that neutralizes process effects.

8. The method of halftoning separations of a color image of claim 1 wherein the step of: associating a first line screen with a third colorant comprises associating the first line screen with the lightest colorant of a set of cyan, magenta, and black colorants.

9. The method of halftoning a color image of claim 2 wherein the step of: associating a second line screen with a fourth colorant comprises associating the second line screen with a yellow colorant.

10. The method of halftoning a color image of claim 2 further comprising orienting the screens at angular distances rationally divisible by 30 degrees.

11. The method of halftoning a color image of claim 8 further comprising orienting the first and second line screens 90 degrees apart.

12. The method of halftoning a color image of claim 8 further comprising orienting the first dot screen at 15 degrees.

13. An image processor operative to halftone an image so that the image can be rendered without displeasing moiré patterns, the image processor comprising:
- a selected set of halftone screens including a first dot screen, a first line screen, and a third screen, the screens selected and oriented so that fundamental frequency vectors of the screens combine to yield only moiré frequency vectors of types selected from the group consisting of zero frequency moiré frequency vectors, near zero frequency moiré frequency vectors, and high frequency moiré frequency vectors; and,
- a halftoner operative to associate the first dot screen, the first line screen and the third screen with first, second and third color separations respectively and to use the associated screens to halftone the image by halftoning the respective separations.

14. The image processor of claim 13 wherein the third screen comprises a second dot screen.

15. The image processor of claim 14 wherein the selected set of halftone screens further comprises a second line screen and wherein the halftoner is further operative to associate the second line screen with a fourth respective color separation and to use the associated screens to halftone the image by halftoning the respective separations.

16. The image processor of claim 13 further comprising a print engine operative to render the halftoned image.

17. The image processor of claim 16 wherein the print engine comprises one of a xerographic printer, a lithographic printer and an ink jet printer.

18. The image processor of claim 13 wherein the first line screen comprises a hybrid line screen.

19. The image processor of claim 15 wherein the second line screen comprises a hybrid line screen.

20. The image processor of claim 13 wherein the third screen comprises a second line screen.

21. The image processor of claim 13 wherein the selected set of halftone screens are selected and oriented so that frequency vectors of the screens and a frequency vector describing a process effect combine to only produce moiré frequency vectors of types from the group consisting of zero frequency moiré frequency vectors, near zero frequency moiré frequency vectors, and high frequency moiré frequency vectors.

22. A method of halftoning a color image that avoids two and three color moiré patterning, the method comprising the steps of:
- selecting a set of screens that have fundamental frequency vectors that combine to yield only high frequency moiré frequency vectors;
- associating a first dot screen from the selected set of screens with a first colorant;
- associating a first line screen from the selected set of screens with a second colorant;
- associating a second line screen from the selected set of screens with a third colorant;
- receiving the color image to be halftoned; and,
- halftoning the color image with the associated screens.

23. The method of halftoning separations of a color image of claim 22 wherein the step of associating a first line screen from the selected set of screens with a second colorant further comprises associating the first line screen with a cyan colorant.

24. The method of halftoning separations of a color image of claim 22 wherein the step of associating a second line screen from the selected set of screens with a third colorant further comprises associating the second line screen with a magenta colorant.

25. The method of halftoning separations of a color image of claim 22 wherein the step of associating a first dot screen from the selected set of screens with a first colorant further comprises associating the first line screen with a black colorant.

26. The method of halftoning a color image of claim 22 further comprising the step of: analyzing process effects wherein the step of selecting a set of screens further comprises:
- selecting a set of screens that when combined with the analyzed process effects, results in only high frequency moiré frequency vectors.

* * * * *